(12) United States Patent
Rastoll et al.

(10) Patent No.: US 10,908,604 B2
(45) Date of Patent: Feb. 2, 2021

(54) REMOTE OPERATION OF VEHICLES IN CLOSE-QUARTER ENVIRONMENTS

(71) Applicant: Valeo Schalter und Sensoren GmbH, Bietigheim-Bissingen (DE)

(72) Inventors: Cyril Rastoll, Palo Alto, CA (US); Shahram Rezaei, Danville, CA (US); Malte Joos, Stuttgart (DE)

(73) Assignee: VALEO SCHALTER UND SENSOREN GMBH

( * ) Notice: Subject to any disclaimer, the term of this patent is extended or adjusted under 35 U.S.C. 154(b) by 101 days.

(21) Appl. No.: 16/221,124

(22) Filed: Dec. 14, 2018

(65) Prior Publication Data
US 2020/0192352 A1    Jun. 18, 2020

(51) Int. Cl.
*G05D 1/00* (2006.01)
*B60R 1/00* (2006.01)
*B60W 30/06* (2006.01)

(52) U.S. Cl.
CPC .......... *G05D 1/0038* (2013.01); *B60R 1/00* (2013.01); *B60W 30/06* (2013.01); *G05D 1/0016* (2013.01); *B60R 2300/303* (2013.01); *G05D 2201/0213* (2013.01)

(58) Field of Classification Search
CPC ............ G01D 1/16; G01D 1/38; B60W 10/04
USPC .......................................................... 701/2
See application file for complete search history.

(56) References Cited

U.S. PATENT DOCUMENTS

2007/0198144 A1* 8/2007 Norris .................. H04L 67/12
701/23
2017/0253237 A1* 9/2017 Diessner ............... B60W 10/04
2018/0010915 A1* 1/2018 Wilhelm .............. G05D 1/0242
2018/0088571 A1* 3/2018 Weinstein-Raun .........................
G05D 1/0287
2018/0334189 A1* 11/2018 Benmimoun ...... B62D 15/0285

OTHER PUBLICATIONS

Said, "Phantom Auto Plans Remote-Control Centers for Robot Cars," Available online at: https://www.sfgate.com/news/article/Phantom-Auto-plans-remote-control-centers-for-12408046.php, Dec. 8, 2017 [retrieved on Dec. 21, 2018], 5 pages.

* cited by examiner

*Primary Examiner* — Albert K Wong
(74) *Attorney, Agent, or Firm* — Weaver Austin Villeneuve & Sampson LLP

(57) ABSTRACT

Techniques for remote operation of vehicles are presented. Remote operation can involve maneuvering, by a vehicle computer system, a vehicle based on driving instructions from a remote computer system. The vehicle computer system collects sensor data from a plurality of sensors onboard the vehicle. Based on the sensor data, data associated with a visual representation of the surrounding environment is generated and sent to the remote computer system. The generating of the data can involve fusing sensor data to identify one or more features of a surrounding environment. The generated data may be indicative of the identified features. The visual representation is output on a display device of the remote computer system. The driving instructions can be based on human input supplied in response to the visual representation. In certain embodiments, the vehicle is maneuvered toward a location within proximity of a parking space before performing automated parking.

18 Claims, 13 Drawing Sheets

REMOTE OPERATION OF VEHICLES IN CLOSE-QUARTER ENVIRONMENTS

BACKGROUND

Aspects of the disclosure relate to techniques for remote operation (also known as teleoperation) of vehicles in close-quarter environments such as parking environments. Operating vehicles in close-quarter environments is particularly challenging because it involves a higher degree of precision than operating vehicles in less restrictive environments, such as streets or highways. For example, a driving lane in a parking environment is typically at least 25% narrower than a driving lane on a street or highway.

Having more environmental data may enable remote-operated vehicles to be controlled with a higher degree of precision. For example, a remote operator can be provided with visual data (e.g., video and/or still images) captured by an onboard camera. However, visual data is inadequate for precisely determining distances between objects. High definition (HD) maps with accurate location may ameliorate the deficiencies of visual data, but HD maps limit remote operation to environments that have been mapped beforehand. Furthermore, live driving conditions may change, and dynamic obstacles (such as pedestrians, other vehicles, etc.) that are not present on an HD map may unexpectedly appear in a real-world close-quarter environment. Integrating sensors into an environment may also ameliorate the deficiencies of visual data. However, this would require setup of sensors in the driving environment in advance. Thus, a more robust approach for remote operation of vehicles in close-quarter environments is desirable.

SUMMARY

In certain embodiments, a computer system of a remote-operated vehicle may collect sensor data from a plurality of sensors in the vehicle to determine information about a surrounding environment. The surrounding environment can be a parking environment, such as an outdoor parking lot or an indoor garage. The sensor data, or data derived therefrom, may be sent via a wireless communication link to a remote computer system of a human operator. The sensor data can be analyzed, for example, by the computer system of the vehicle, to generate data associated with a visual representation of the surrounding environment. This data can then be used to generate a visual representation of the surrounding environment for output on one or more display devices of the remote computer system, thereby providing the remote operator with visual information that aids in remote control of the vehicle.

Various examples of visual representations of surrounding environments are disclosed herein. In certain embodiments, a visual representation may comprise a video of the surrounding environment. The video can be based on images captured by one or more cameras on board the vehicle. The video can be generated at the vehicle and transmitted to the remote computer system, e.g., as a live video stream. Alternatively, the visual representation can be an artificial reconstruction of the surrounding environment, in which case the reconstruction may be generated either at the vehicle or at the remote computer system based on data sent from the vehicle computer system. In certain embodiments, the reconstruction is a three-dimensional (3D) reconstruction including graphical elements corresponding to objects (e.g., pedestrians, structural elements of the environment, other vehicles, etc.) in the surrounding environment. Thus, the data that is associated with the visual representation and sent to the remote computer system may include raw sensor data, processed sensor data, and/or information derived from sensor data.

In certain embodiments, the data associated with the visual representation of the surrounding environment may be generated based on fusion of sensor data from at least two sensors of the vehicle. For example, video data from a camera can be fused with video data from a second camera or data captured by a different type of sensor such as a Light Detection and Ranging (LIDAR) sensor, a Radio Detection and Ranging (radar) sensor, an ultrasonic sensor, etc. Thus, the sensor data can be captured by camera sensors, non-camera sensors, or a combination of camera and non-camera sensors. Fusion refers to a process of combining sensor data from a plurality of sources to determine information not available when the data sources are considered individually. In certain embodiments, fusion may be applied to identify one or more features in a surrounding environment and to determine attributes of those features. For example, in certain embodiments, a distance to an object may be calculated through fusion of image data from multiple cameras or fusion of camera data with non-camera data. Sensor fusion therefore provides a greater amount of information about the vehicle and/or the surrounding environment.

In certain embodiments, a visual representation of a surrounding environment may include one or more graphical elements corresponding to features of the surrounding environment. For example, a video or reconstruction of the surrounding environment may include an outline of an object (e.g., a bounding box around the object), a silhouette of the object, or a graphical indication of the distance of the object from the vehicle (e.g., a marker that varies in size, shape, or color based on distance, or a text annotation stating the distance).

In certain embodiments, the visual representation of the surrounding environment may include a model of the vehicle. For example, an image derived from a model of the vehicle may be overlaid onto a video of the surrounding environment. Similarly, a 3D reconstruction of the surrounding environment may show a model of the vehicle in 3D space and in spatial relation to graphical elements corresponding to objects in the surrounding environment. The visual representation may depict the model from an overhead perspective, e.g., a perspective looking down on the vehicle at a 45-degree angle. This allows the remote operator to see clearly how the vehicle is positioned relative to a nearby object. In certain embodiments, the perspective may be adjustable. For example, the visual representation may be rotated to show the vehicle from a different angle.

In certain embodiments, the vehicle computer system is configured to receive driving instructions from the remote computer system. The driving instructions may be sent as one or more signals over a wireless communication link. The driving instructions may include inputs for effecting longitudinal control (e.g., acceleration or braking) and/or lateral control (e.g., steering). The driving instructions can be based on input from a remote operator in response to viewing the visual representation of the surrounding environment. Based on these driving instructions, the vehicle computer system can maneuver the vehicle toward a location that is within proximity of a parking space. The vehicle computer system may then perform automated parking to park the vehicle into the parking space.

In certain embodiments, the vehicle computer system receives a parking instruction from the remote computer system after reaching the location to which the vehicle is maneuvered based on input from the remote operator. The parking instruction may simply be a command to initiate automated parking or to initiate automated unparking. In some embodiments, the parking instruction may include information about a location of the parking space. For example, the remote operator may specify a location on the display of the remote computer system in order to indicate to the vehicle computer system that the location corresponds to an intended parking space.

As an alternative to receiving parking instructions, the vehicle computer system may perform automated parking in response to detecting one or more conditions which indicate that automated parking can be performed successfully (e.g., the vehicle is within a certain distance of the parking space, the boundaries of the parking space have been identified based on sensor data, etc.).

In some embodiments, the vehicle computer system may be configured to perform automated emergency braking (AEB) in response to determining that a driving instruction received from the remote computer system would cause the vehicle to collide with an object in the surrounding environment. Further, in some embodiments, the vehicle computer system may be configured to perform automatic speed reduction in response to detecting an interruption in a wireless communication link through which data associated with a visual representation is sent to the remote computer system. The automatic speed reduction can be performed until the vehicle comes to a stop or until the wireless communication link becomes available again.

DETAILED DESCRIPTION

Figure 1:
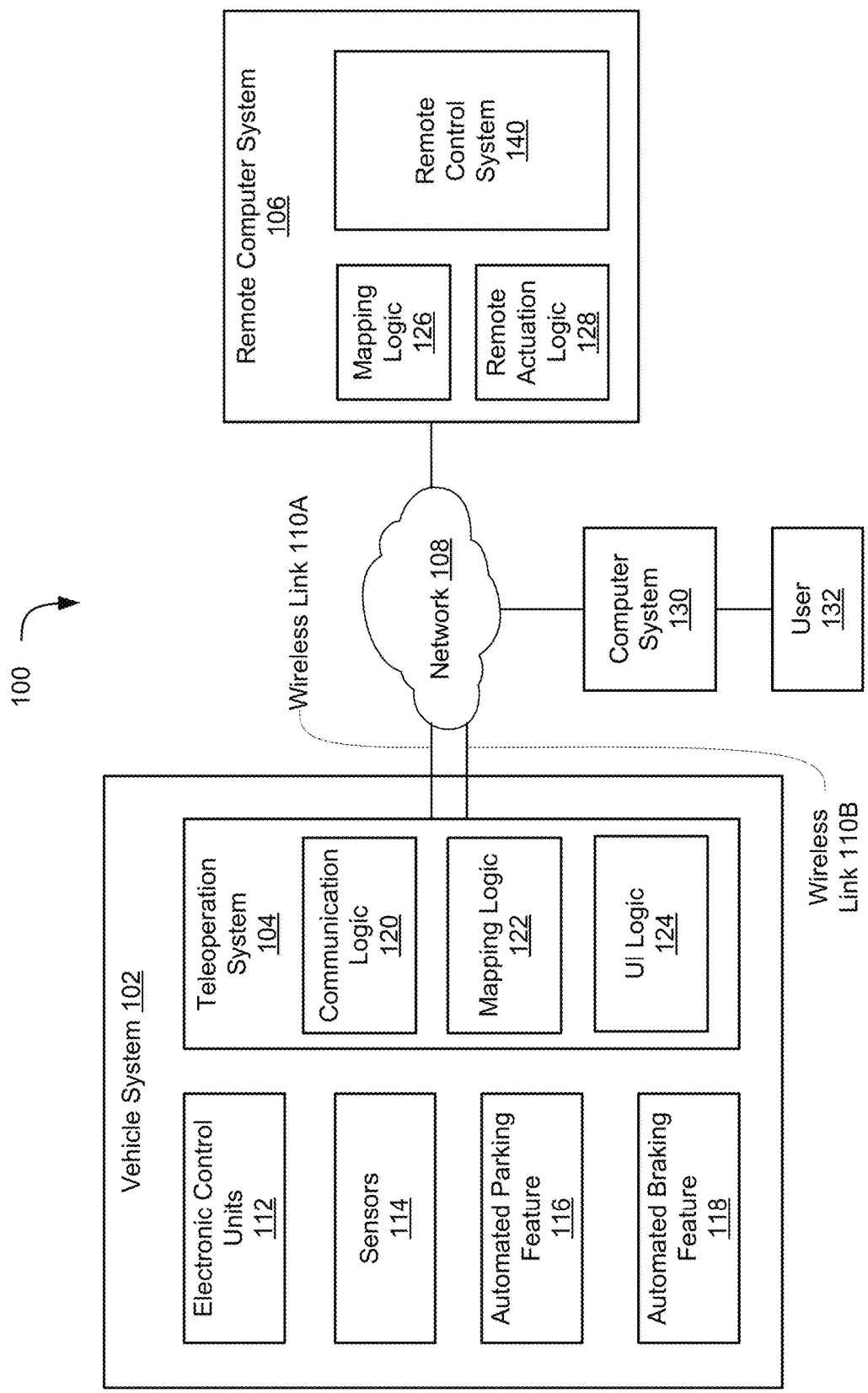
FIG. 1 illustrates an example computing environment that may incorporate one or more embodiments.

Several illustrative embodiments will now be described with respect to the accompanying drawings. The embodiments described herein may include methods, systems, and non-transitory computer-readable storage media storing instructions executable by one or more processors of a computer system. While particular embodiments, in which one or more aspects of the disclosure may be implemented, are described below, other embodiments may be used and various modifications may be made without departing from the scope of the disclosure or the spirit of the appended claims.

Described herein are techniques related to a robust approach for remotely operating vehicles in close-quarter environments. The techniques enable vehicles to be operated remotely without necessarily requiring prior knowledge of the environments or integration of sensors into the environments. Instead, environments may be mapped "on-the-fly" using in-vehicle sensors. This enables vehicle operation to adapt to dynamically changing environments where objects, such as pedestrians or other vehicles, can appear unexpectedly. As used herein, "remote operation" refers to manual control of a vehicle from a distance through instructions sent over one or more communication networks that wirelessly couple the vehicle to a computer system of a human operator.

Using a variety of sensors to map a close-quarter environment may provide rich details relating to the environment. This richness of data enables a high degree of precision (e.g., centimeter-level accuracy) when remotely operating a vehicle. For example, a camera video stream alone may be insufficient for the remote driver to perceive whether a vehicle can safely maneuver around a concrete pylon; however, supplementing the camera data with other sensor data (e.g., through fusion of image data from one or more cameras with data from a radar sensor and data from a steering angle sensor) not only enables determining the distance between the vehicle and the concrete pylon with a high degree of precision, but also enables determining whether the concrete pylon is in the vehicle's predicted path of travel.

The richness of the "on-the-fly" mapping enables a visual representation of the surrounding environment to be generated to aid the operator of a remote computer system in remotely controlling the vehicle. In particular, the mapping enables a more detailed visual representation than would otherwise be provided through the use of camera images alone. The remote operator may provide input via one or more user input devices of the remote computer system. Based on these inputs, the driving instructions may be sent to the vehicle computer system. The driving instructions may include lateral and/or longitudinal control instructions for remotely maneuvering the vehicle to a location within proximity to a parking space. After reaching the location, the vehicle computer system may receive a parking instruction, based on input from the remote operator, for initiating automated parking.

Various techniques described herein use sensor data from a plurality of sensors in a vehicle. In-vehicle or onboard sensors can be located anywhere on the vehicle including, by not limited to, inside a body of the vehicle and mounted to the exterior of the vehicle.

System Overview

FIG. 1 illustrates a computing environment 100 that may incorporate one or more embodiments. FIG. 1 is merely provided as an example of a computing environment in which the techniques described herein may be implemented; other configurations are also contemplated to be within the scope of the disclosure. For example, one or more components may be omitted from FIG. 1, rearranged in FIG. 1, consolidated with another component illustrated in FIG. 1, distributed across multiple systems illustrated in FIG. 1, and/or added to FIG. 1 without departing from the scope of the disclosure or the spirit of the appended claims.

In the example of FIG. 1, computing environment 100 comprises a vehicle system 102 and a remote computer system 106 communicatively coupled by a network 108.

Vehicle System

Vehicle system 102 may comprise any number of components that control various aspects of a vehicle such as a car, truck, van, bus, boat, plane, etc. In the example of FIG.

1, vehicle system 102 comprises a teleoperation system 104, electronic control units (ECUs) 112, a plurality of sensors 114, an automated parking feature 116, and an automated braking feature 118.

Vehicle system 102 comprises a computer system that includes the ECUs 112. ECUs 112 may comprise any number of embedded systems that each control one or more electrical systems or other subsystems of vehicle system 102. Examples of ECUs 112 may include, without limitation, an engine control unit, a power steering control unit, a powertrain control module, a speed control unit, a telematics control unit, a transmission control unit, and/or a brake control module. In some embodiments, ECUs 112 may comprise one or more processors and one or more non-transitory computer-readable storage media storing processor-executable instructions.

Sensors 114 may comprise any number of devices that provide information about the vehicle in which vehicle system 102 is deployed and/or an environment external to the vehicle. Examples of sensors 114 may include, without limitation, a camera, a microphone, a radar sensor, an ultrasonic sensor, a LIDAR sensor, a global positioning system (GPS) sensor, a steering angle sensor, and/or a motion sensor (e.g., an accelerometer and/or gyroscope). Sensors are described in greater detail below with reference to FIG. 2.

Automated parking feature 116 may comprise hardware (e.g., an actuator) and/or software (e.g., an algorithm) that enables autonomous performance of parallel, perpendicular, and/or angle parking. In some embodiments, automated parking feature 116 may comprise a set of instructions that coordinate between one or more ECUs 112 (e.g., a power steering control unit and/or a powertrain control module) and one or more sensors 114 (e.g., a camera, a radar sensor, an ultrasonic sensor, and/or a LIDAR sensor) during execution of a parking maneuver.

Automated braking feature 118 may comprise hardware (e.g., an actuator) and/or software (e.g., an algorithm) that enables collision avoidance. More specifically, collisions may be avoided based on autonomous application of brakes when an object is detected in a predicted travel path (e.g., a straight/angled forward travel path or a straight/angled reverse travel path). In some embodiments, automated braking feature 118 may comprise a set of instructions that coordinate between one or more ECUs 112 (e.g., a brake control module) and one or more sensors 114 (e.g., a camera, a radar sensor, an ultrasonic sensor, and/or a LIDAR sensor) to determine when to perform braking.

Teleoperation system 104 may comprise one or more computing devices (e.g., hardware processors, microcontrollers, systems on a chip, etc.) that, among other things, facilitate communication between vehicle system 102 and remote computer system 106. In FIG. 1, teleoperation system 104 is depicted as part of vehicle system 102. However, teleoperation system 104 can be implemented as a separate system that is communicatively coupled to vehicle system 102. Thus, teleoperation system 104 may be a standalone computer system. For example, teleoperation system 104 may be an "aftermarket" device specially configured to interface with particular vehicle makes and/or models.

In certain embodiments, teleoperation system 104 may comprise one or more processors and one or more non-transitory computer-readable storage media storing instructions executable by the one or more processors of the teleoperation system 104. The instructions of teleoperation system 104 may implement, without limitation, communication logic 120, mapping logic 122, and user interface (UI) logic 124. Each of these example logics is described below.

As illustrated in FIG. 1, teleoperation system 104 may be communicatively coupled to remote computer system 106 via the network 108. Network 108 may comprise one or more communication networks. Example communication networks may include, without limitation, the Internet, a wide area network (WAN), a local area network (LAN), a public network, a private network, a wired network, and/or a wireless network. Due to the mobile nature of vehicle system 102, teleoperation system 104 typically connects to network 108 via one or more wireless communication links, such as wireless links 110A and 110B. Wireless links 110A-B may comprise a cellular network connection, a WiFi network connection, a Bluetooth network connection, and/or any other network connection based on a wireless communication protocol.

The transmission speed of a wireless link (e.g., as measured in terms of latency, bandwidth, and/or throughput) may vary significantly from one moment to another and/or from one location to another. This can be problematic when remotely operating a vehicle in a close-quarter environment, because even a slight delay (e.g., few hundreds of milliseconds) can result in a collision. Accordingly, teleoperation system 104 may comprise a set of instructions (e.g., communication logic 120) that establishes and concurrently maintains multiple wireless network connections for communicating with remote computer system 106. For example, wireless link 110A may be a cellular network connection, and wireless link 110B may be a WiFi network connection. In another example, wireless link 110A may use the 5$^{th}$ generation of cellular communication systems (5G) while wireless link 110B may use the 4th generation of cellular communication systems (4G). Although only two different wireless links are illustrated in FIG. 1, it should be appreciated that teleoperation system 104 may establish and concurrently maintain any number of wireless links.

In some embodiments, communication logic 120 may monitor a transmission speed of each wireless link 110 (e.g., by determining latency, bandwidth, and/or throughput) and enable communication via the wireless link exhibiting the fastest speed (e.g., lowest latency and/or greatest bandwidth) at a particular point in time. For example, if wireless link 110A exhibits lower latency than wireless link 110B at time T1, then teleoperation system 104 may communicate via wireless link 110A and not wireless link 110B; however, if wireless link 110A exhibits higher latency than wireless link 110B at time T2, then teleoperation system 104 may communicate via wireless link 110B and not wireless link 110A. The quantity of data transmitted may also be lowered as necessary. For example, the resolution level of images transmitted may be lowered when latency is high and/or bandwidth is small.

In some embodiments, communication logic 120 may enable communication via multiple wireless links for redundancy. For example, teleoperation system 104 may communicate the same data via each of wireless links 110A-B.

Among other things, teleoperation system 104 may communicate data associated with a visual representation of a surrounding environment to remote computer system 106 via one or more of the wireless links 110A-B. The communicated data may comprise raw sensor data captured by sensors 114, processed sensor data, and/or data derived from the sensor data, and enables the visual representation to be output on one or more display devices of remote computer system 106. In some embodiments, the visual representation may comprise an aggregated camera view of vehicle system 102 and/or its surroundings. The aggregated camera view may be generated by a set of instructions (e.g., mapping logic 122) that stitch together images from multiple camera angles (e.g., from the front, back, and sides of the vehicle in which vehicle system 102 is deployed).

In certain embodiments, the data associated with the visual representation is generated by the teleoperation system 104. For example, mapping logic 122 may generate the data associated with the visual representation by fusing data from a plurality of sensors to identify one or more features of the surrounding environment. Such features may include objects such as people, other vehicles, structural elements of a parking garage (e.g., walls, pylons, support columns, etc.), boundary lines of a parking space, or any other feature that can be detected from the sensor data. Identifying a feature may comprise detecting the presence of the feature in the surrounding environment. The identification may further comprise determining, based on the sensor data, one or more attributes of the detected feature. For example, image data from a first camera can be fused with image data from a second camera to determine the distance of an object when the relative positions of the two cameras are known. Other methods of determining the distance of an object can be used in addition or as an alternative to fusing camera data. For example camera data can be used to form a rough estimate of the distance of an object, with the rough estimate being refined based on LIDAR, radar or ultrasonic data to determine the distance more precisely.

Accordingly, mapping logic 122 may comprise a set of instructions that combine data from sensors 114. The combined sensor data may be used to generate a composite mapping of the environment surrounding the vehicle. For example, signals generated by cameras, ultrasonic sensors, radar sensors, and LIDAR sensors may be used to generate a composite mapping that includes visual indications relating to objects in the surrounding environment, such as distances to objects, speeds of the objects, and other metrics. Composite mappings are described in greater detail below with reference to FIG. 3.

Other attributes of features in the surrounding environment besides distance can also be determined from sensor data and are within the scope of the present disclosure. For example, mapping logic 122 may determine the size, shape, location, and/or trajectory of an object and to integrate any of determined attributes into the visual representation. In certain embodiments, the features and/or attributes may be inserted into the visual representation as graphical elements. For example, a bounding box can be drawn around an object or a predicted trajectory of the object displayed as a line or curve. Graphical elements may also include text annotations, such as a line of text displayed next to an object to indicate the object's speed.

In certain embodiments, the visual representation is an artificial reconstruction of the surrounding environment. For example, the visual representation may be a 3D reconstruction generated based on determining, by the mapping logic 122 using the sensor data, the size, shape, location, and/or other attributes of objects in the surrounding environment. Objects may be represented in any number of ways in a reconstruction. For example, an object may be depicted as a silhouette or a geometric approximation of the actual shape of the object. In some implementations, an object may be represented as 3D box that roughly corresponds to the physical boundaries of the object. In yet another implementation, the object could be represented using dots that correspond to points on a surface of the object. The location of these points can be determined, for example, using a LIDAR sensor.

Reconstructions provide a concise way to depict features in the surrounding environment and are advantageous in that reconstructions can be generated using less data compared to using actual images of the surrounding environment. For example, a reconstruction may be formed by sending to the remote computer system 106 data indicating the position (e.g., at least one two-dimensional (2D) or 3D coordinate) of an object and the size of the object. Thus, data associated with a reconstruction may be sent as a substitute for camera images in situations where transmission speed is limited, e.g., in response to detecting that the data transmission speed has fallen below a certain threshold. Accordingly, in certain embodiments, vehicle system 102 may monitor the transmission speed (e.g., by determining latency, bandwidth, and/or throughput) and switch from sending data associated with a video based visual representation to sending data associated with a reconstruction. The switching can also be performed upon request from the remote computer system 106 (e.g., based on monitoring of data transmission speed by remote computer system 106 or based on input from the remote operator). Reconstructions can also be used to supplement camera images and, in some embodiments, may be output together with camera images on one or more display devices of the remote computer system 106.

In certain embodiments, the visual representation includes a depiction of the vehicle itself. The vehicle depiction can be based on a computer model of the vehicle. For example, the visual representation may comprise a 360-degree video generated based on images captured by multiple cameras, and the image of the vehicle may be added to the 360-degree video to show the vehicle from an overhead perspective, e.g., from the point of view of an observer flying above the vehicle. In this manner, the remote operator may be able to see the boundaries of the vehicle in spatial relation to an object in the surrounding environment.

The visual representation can be generated at the vehicle system 102 or at the remote computer system 106. For example, mapping logic 126 may generate the visual representation locally using the data sent from teleoperation system 104. Alternatively, the visual representation can be generated, at least in part, by the mapping logic 122 and transmitted to remote computer system (e.g., as a video stream together with other data associated with the visual representation such as data indicating attributes of detected objects).

UI logic 124 may comprise a set of instructions that facilitates interaction between a user of vehicle system 102 (e.g., a driver of the vehicle) and teleoperation system 104. In turn, teleoperation system 104 may serve as an intermediary between the user and remote computer system 106. For example, teleoperation system 104 may be operatively coupled to an in-vehicle output device (e.g., a display device that can be mounted on a dashboard), an in-vehicle input device (e.g., a push button mounted on a rear-view mirror or a dashboard), or a combination thereof (e.g., a microphone and speaker system). Thus, UI logic 124 may comprise instructions for processing data sent to/received from an output/input device of the vehicle.

Remote Computer System

Remote computer system 106 may comprise one or more computing devices that facilitate remote operation of the vehicle through communication with teleoperation system 104. For example, remote computer system 106 may comprise one or more cloud server computers that are situated remotely from vehicle system 102.

In certain embodiments, remote computer system 106 may comprise one or more processors and one or more non-transitory computer-readable storage media storing instructions executable by the one or more processors of the remote computer system 106. The instructions of remote computer system may include, without limitation, mapping logic 126 and remote actuation logic 128. Each of these example logics is described below.

Mapping logic 126 may comprise a set of instructions that operate to receive data associated with a visual representation from the teleoperation system 104 and to process the received data, causing the visual representation to be output on one or more display devices of remote control system 140. In certain embodiments, the mapping logic 126 may receive the data as a video stream, which can include raw or processed camera images and, optionally, graphical elements inserted into the video based on results from sensor fusion. Alternatively or additionally, mapping logic 126 may receive data associated with an artificial reconstruction.

In certain embodiments, mapping logic 126 may generate all or part of a visual representation. For example, mapping logic 126 may receive a video stream together with data indicating the size, location, shape, speed, distance, and/or other data relating to an object and then insert graphical elements into the video stream based on the data relating to the object. As another example, mapping logic 126 may generate a 3D reconstruction of the surrounding environment by adding a box representing an object, where the size and location of the box are specified in the data received from teleoperation system 104.

Remote actuation logic 128 may comprise a set of instructions that generate driving instructions and/or parking instructions for remotely operating vehicle system 102. The driving or parking instructions may be sent to the vehicle system 102 via the teleoperation system 104 and in the form of one or more wireless signals communicated over network 108. When executed by the vehicle system 102 (e.g., by one or more ECUs 112), the driving instructions cause the vehicle to maneuver within the surrounding environment (e.g., a close-quarter environment such as parking garage). Similarly, a parking instruction may cause the vehicle system 102 to perform parking or unparking, using automated parking feature 116.

Remote control system 140 may comprise one or more computing devices that receive input from a human operator (i.e., the remote operator) and generate driving and parking instructions for transmission to vehicle system 102. In certain embodiments, each of the one or more computing devices of remote control system 140 may comprise one or more processors and one or more non-transitory computer-readable storage media storing instructions executable by the one or more processors of remote control system 140.

Remote control system 140 may provide a user interface (e.g., a graphical user interface) that enables the remote operator to view the visual representation and to provide input for generating driving or parking instructions. For example, remote control system 140 may include one or more displays configured to display the visual representation based on signals received from mapping logic 126. Remote control system 140 may further include additional input or output devices, such as a mouse, a keyboard, a microphone, audio speakers, a steering wheel, a brake pedal, an acceleration pedal, etc. In certain embodiments, remote control system 140 may include an automated parking button which, when pushed, causes remote control system 140 to generate a parking signal as input to the vehicle system 102. Details of an example remote control system are described below with reference to FIG. 7.

Additional Computer System

In certain embodiments, computing environment 100 may further comprise a computer system 130. Computer system 130 may comprise one or more computing devices that a user 132 (e.g., the driver of the vehicle or the owner of the vehicle that may or may not be in the vehicle) may use to communicate with the remote computer system 106. For example, computer system 130 may be a smartphone, a tablet computer, a laptop computer, a desktop computer, or the like. Computer system 130 may be used to send requests to the vehicle system 102 and/or the remote computer system 106. For example, computer system 130 may enable the user 132 to remotely initiate the automated parking feature 116 to unpark the vehicle from its parking space. Computer system 130 may also enable a request for remote operator assistance in connection with parking or unparking to be sent to remote computer system 106.

Computer system 130 may comprise one or more processors and one or more non-transitory computer-readable storage media storing instructions that are executable by the one or more processors of the computer system 130. The instructions may cause the one or more processors to perform various operations including, without limitation, presenting information (e.g., an image and/or a geolocation) relating to the vehicle, communicating a geolocation of user 132, and/or requesting remote operation of the vehicle.

Sensor System

The following section describes an example configuration of sensors that correspond to the sensors 114 of vehicle system 102. Each of the sensors described in connection with FIG. 2 may send and/or receive signals (e.g., signals broadcast into the surrounding environment) that are processed to determine attributes of features (e.g., objects) in the surrounding environment. In particular, the signals received by the sensors depicted in FIG. 2 may correspond to data that is applied in or more fusion processes.

Figure 2:
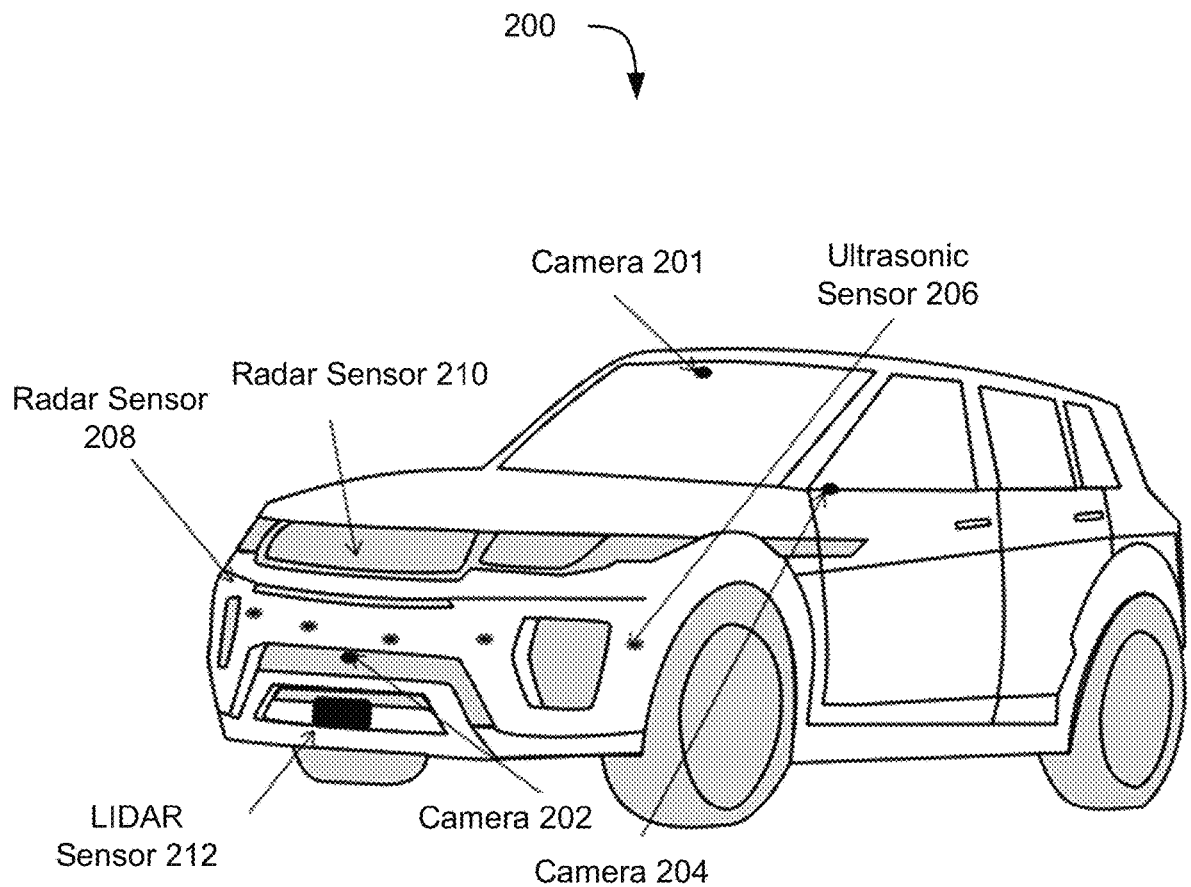
FIG. 2 illustrates an example sensor configuration of a vehicle.

FIG. 2 illustrates a front-left perspective view of a vehicle 200. FIG. 2 is merely provided as an example; other configurations (e.g., configurations comprising sensors not illustrated in FIG. 2) are also contemplated to be within the scope of the disclosure. For example, one or more sensors may be omitted from FIG. 2, placed at another location in FIG. 2, consolidated with another sensor illustrated in FIG. 2, and/or added to FIG. 2 without departing from the scope of the disclosure or the spirit of the appended claims.

In the example of FIG. 2, vehicle 200 includes a plurality of sensors disposed at various locations throughout the vehicle. The plurality of sensors comprise cameras 201-204, ultrasonic sensor 206, radar sensors 208 and 210, and LIDAR sensor 212. Each of these sensors may generate signals that provide information relating to vehicle 200 and/or an environment external to the vehicle.

Cameras 201-204 may be used to provide visual information relating to the vehicle 200 and/or its surroundings. Cameras 201-204 may comprise a wide-angle lens, such as a fisheye lens that can provide, for example, a 190-degree angle of view. Multiple cameras may provide multiple views that can be stitched together to form an aggregate view. For example, images from cameras located at each side of the vehicle 200 can be stitched together to form a 360-degree view of the vehicle and/or its environment. In certain embodiments, the 360-degree view may be provided from an overhead perspective, e.g., a perspective looking down on the vehicle at a 45-degree angle.

FIG. 2 illustrates a row of ultrasonic sensors across the front bumper of the vehicle 200. The row of ultrasonic sensors includes ultrasonic sensor 206, which is an example of a sensor located at a corner of the front bumper. The ultrasonic sensors emit ultrasonic waves that can be used by vehicle system 102 to detect objects (e.g., people, structures, and/or other vehicles) in the surrounding environment. In some embodiments, the vehicle system 102 may use the ultrasonic waves to determine speeds, positions (including distances), and/or other attributes of the objects relative to the vehicle.

Radar sensors, such as radar sensors 208 and 210, emit radio waves that can be used by vehicle system 102 to detect objects (e.g., people, structures, and/or other vehicles) in the surrounding environment. In some embodiments, the vehicle system 102 may use the radio waves to determine speeds, positions (including distances), and/or other attributes of the objects. As depicted in FIG. 2, radar sensor 208 is an example of a sensor located at a corner of the front bumper, and radar sensor 210 is located on the front fascia of the vehicle.

LIDAR sensors, such as LIDAR sensor 212, may emit infrared laser light that can be used by vehicle system 102 to detect objects (e.g., people, structures, and/or other vehicles) in the surrounding environment. In some embodiments, the vehicle system 102 may use the infrared laser light to determine speeds, positions (including distances), and/or other attributes of the objects. In the example of FIG. 2, LIDAR sensor 212 is located toward a bottom portion of the vehicle.

Although a rear perspective view of vehicle 200 is not shown in FIG. 2, it should be appreciated that such a view may comprise a similar configuration of sensors. For example, cameras may be located near the upper edge of the rear window, near the center of the rear bumper, and/or on the right-side mirror of the vehicle; a row of ultrasonic sensors may be located across the rear bumper, including the corners; radar sensors may be located on the rear fascia and bumper corners; and/or a LIDAR sensor may be located near the center of the rear bumper.

Each of the aforementioned sensors, alone or in combination with another sensor, may be used to implement various features of vehicle system 102. Examples of such features include, without limitation, generation of data associated with a visual representation, blind spot detection, collision warning, and/or autonomous emergency braking.

Example Visual Representations

Composite Mapping

As mentioned above, vehicle system 102 may comprise different types of sensors that generate signals to provide sensor data (e.g., raw and/or processed data) relating to the vehicle and/or its surroundings. The sensor data may be processed locally within a sensor capturing the sensor data. Additionally or alternatively, the sensor data may be processed by one or more processors of vehicle system 102 (e.g., by teleoperation system 104 or ECUs 112 to generate the data associated with a visual representation).

In certain embodiments, at least some of the sensor data is communicated to a remote computer system (e.g., remote computer system 106), where data processing and feature extraction is performed. The data processing and feature extraction performed by the remote computer system can be based on deep learning models. In certain embodiments, at least some of the sensor data may be combined (e.g., through sensor fusion) to generate a composite mapping or other visual representation of an environment external to the vehicle. The visual representation or data for generating the visual representation may be sent from vehicle system 102 to remote computer system 106 to enable the remote computer system 106 to display the visual representation to the remote operator.

Figure 3:
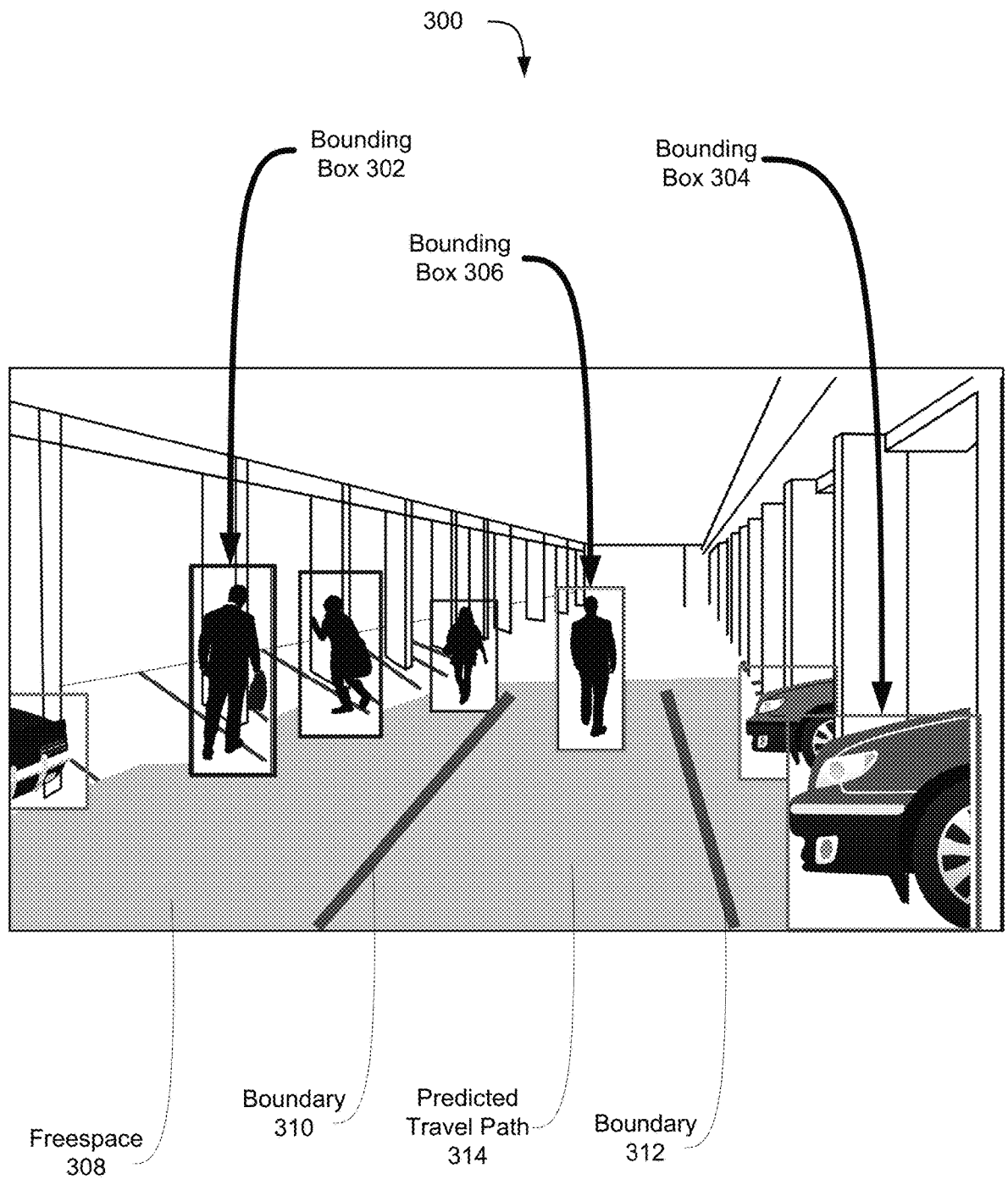
FIGS. 3-6 illustrate examples of different visual representations in accordance with certain embodiments.

FIG. 3 illustrates an example of a composite mapping 300 in which graphical elements have been added to an image captured using one or more cameras of the vehicle. For example, composite mapping 300 may be formed by stitching together images from multiple cameras to form an aggregated camera view and overlaying graphical elements onto the aggregated camera view. The graphical elements may be derived from data captured by different types of sensors. In the example of FIG. 3, the sensors used to generate the graphical elements may include cameras, ultrasonic sensors, a steering angle sensor, a LIDAR sensor, and radar sensors.

The graphical elements in composite mapping 300 may include visual indications of identified objects (e.g., pedestrians, other vehicles, and/or concrete pylons) in the surrounding environment. For example, identified objects may be flagged, highlighted, or otherwise marked to draw the attention of a viewer (e.g., the remote operator). As depicted in FIG. 3, detected objects can be flagged using 2D bounding boxes 302-306, which are included in an augmented reality overlay on camera data. In some embodiments, bounding boxes may be 3D. Different types of objects may be marked using a different color. For example, bounding box 302 may be blue to indicate detection of a pedestrian, whereas bounding box 304 may be green to indicate detection of a car. Although not shown in FIG. 3, in some embodiments, each bounding box may be labeled with information, such as an object identifier (e.g., "Pedestrian" or "Car") and a distance (e.g., "38 inches" or "156 centimeters") from the vehicle in which vehicle system 102 is deployed. Other types of visual indications of objects or other features in the surrounding environment are possible. For example, as depicted in FIG. 3, detected pedestrians may be shown as silhouettes.

Composite mapping 300 may include an indication of a multi-dimensional (e.g., 2D or 3D) region in which the vehicle can be maneuvered. Referring to FIG. 3, such a region is labeled as freespace 308, which includes an area unobstructed by objects.

Composite mapping 300 may include an indication of a predicted travel path 314 for the vehicle. Referring to FIG. 3, predicted travel path 314 may be delineated as a region between boundaries 310 and 312. Predicted travel path 314 may be determined based on data from one or more sensors (e.g., a steering angle sensor and/or a motion sensor). In the example of FIG. 3, predicted travel path 314 is illustrated as a straight path. However, it should be appreciated that predicted travel path 314 can alternatively be a curved path.

In some embodiments, composite mapping 300 may be output together with audio and/or visual warnings relating to objects detected in predicted travel path 314. For example, the pedestrian detected in predicted travel path 314 (indicated by bounding box 306) may be flagged, highlighted, or otherwise marked using a particular color and/or animation (e.g., flashing labels). To illustrate, bounding box 306 may be red and labeled with the phrase "Warning!"

Vehicle Included Visual Representations

As discussed in the section above, composite mappings, in which graphical elements are overlaid on video or still images, are one form of visual representation that can be displayed to a remote operator. Other types of visual representations, such as those illustrated in FIGS. 4-6, may be displayed in addition or as an alternative to composite mappings.

Figure 4:
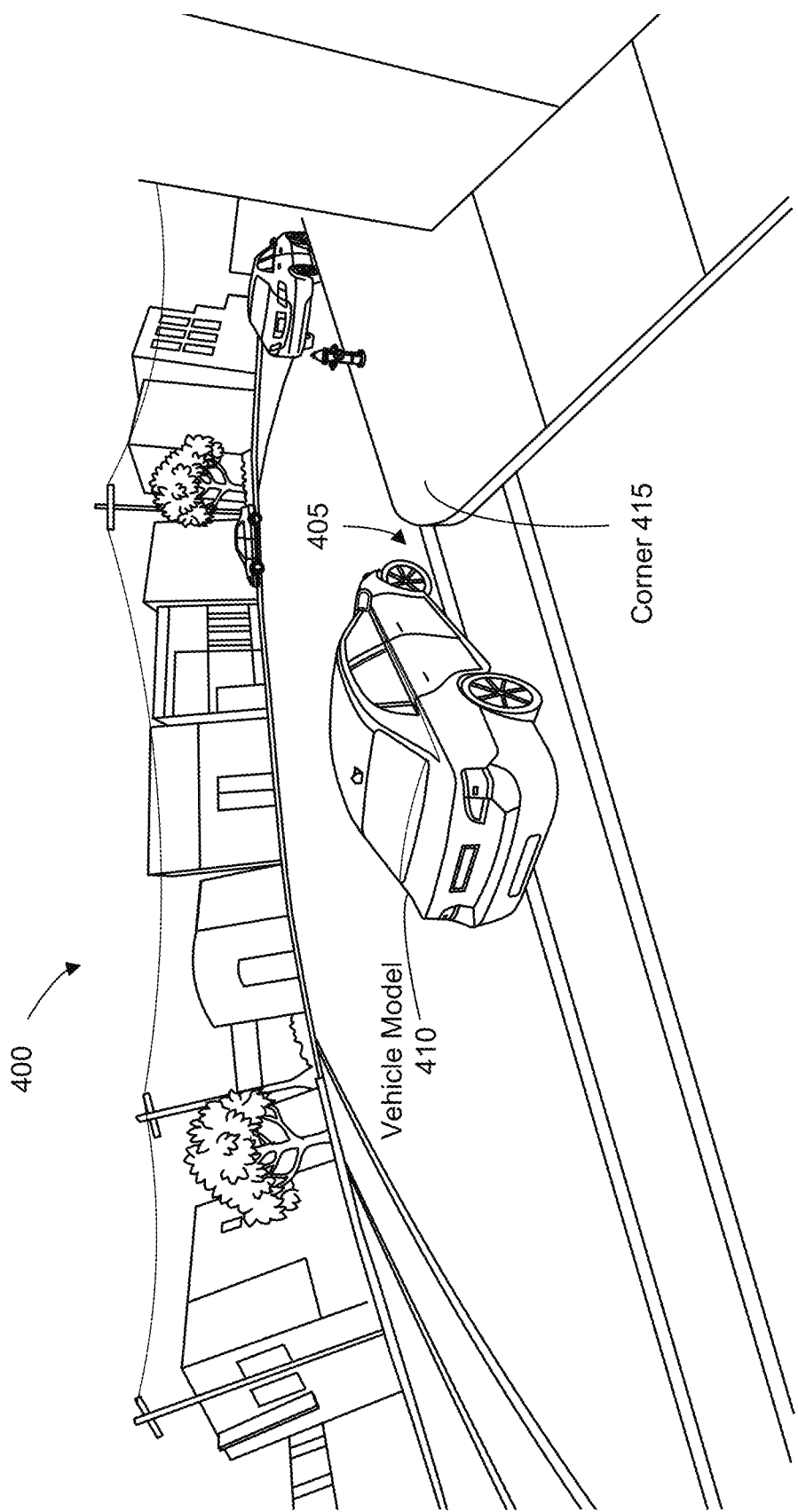

FIG. 4 illustrates an example of a visual representation 400 that depicts a model 410 of a vehicle in which vehicle system 102 is deployed. The visual representation 400 represents a single image from a 360-degree video generated by aggregating multiple camera views. The model 410 is inserted into the visual representation 400 by applying information obtained from the sensors 114 of vehicle system 102 (e.g., sensor data describing the position and orientation of the vehicle) to a 3D model of the vehicle. In this manner, the position of the vehicle can be depicted even though the body of the vehicle may not be fully captured by the cameras onboard the vehicle. The view of the 3D model may be updated continuously to simulate the movement of the vehicle based on the actual vehicle movement. Additionally, the perspective of a 360-degree view may be changed (e.g., by the remote operator) such that the vehicle is shown from a different angle. For example, the perspective in FIG. 4 can be rotated to show the vehicle from directly behind or from the driver side.

Although FIG. 4 is not an example of a close-quarter environment, it will be appreciated that even in environments where the vehicle is generally spaced far enough apart from other objects that a precise estimate of the distance to objects is not necessary for safely maneuvering the vehicle, there may be times when a visual indication of the distance from the vehicle to an object is helpful to a remote operator. For example, FIG. 4 shows the vehicle making a right turn around a corner 415 of a street. Because the visual representation 400 depicts the vehicle from an overhead perspective, the body of the vehicle can be seen clearly in relation to the surrounding environment. Accordingly, a distance 405 between the vehicle and the corner 415 can be perceived even without precisely measuring the distance 405. A remote operator viewing the visual representation depicted in FIG. 4 can therefore maneuver the vehicle while visually confirming that no collisions are imminent. Adding a vehicle model to a visual representation is particularly helpful in turning maneuvers, for example, in a situation where the remote operator initiates a turn via a steering input that causes a front wheel of the vehicle to clear an obstacle such as the corner 415, but where maintaining the same steering input would cause a rear wheel to collide with the obstacle.

Figure 5:
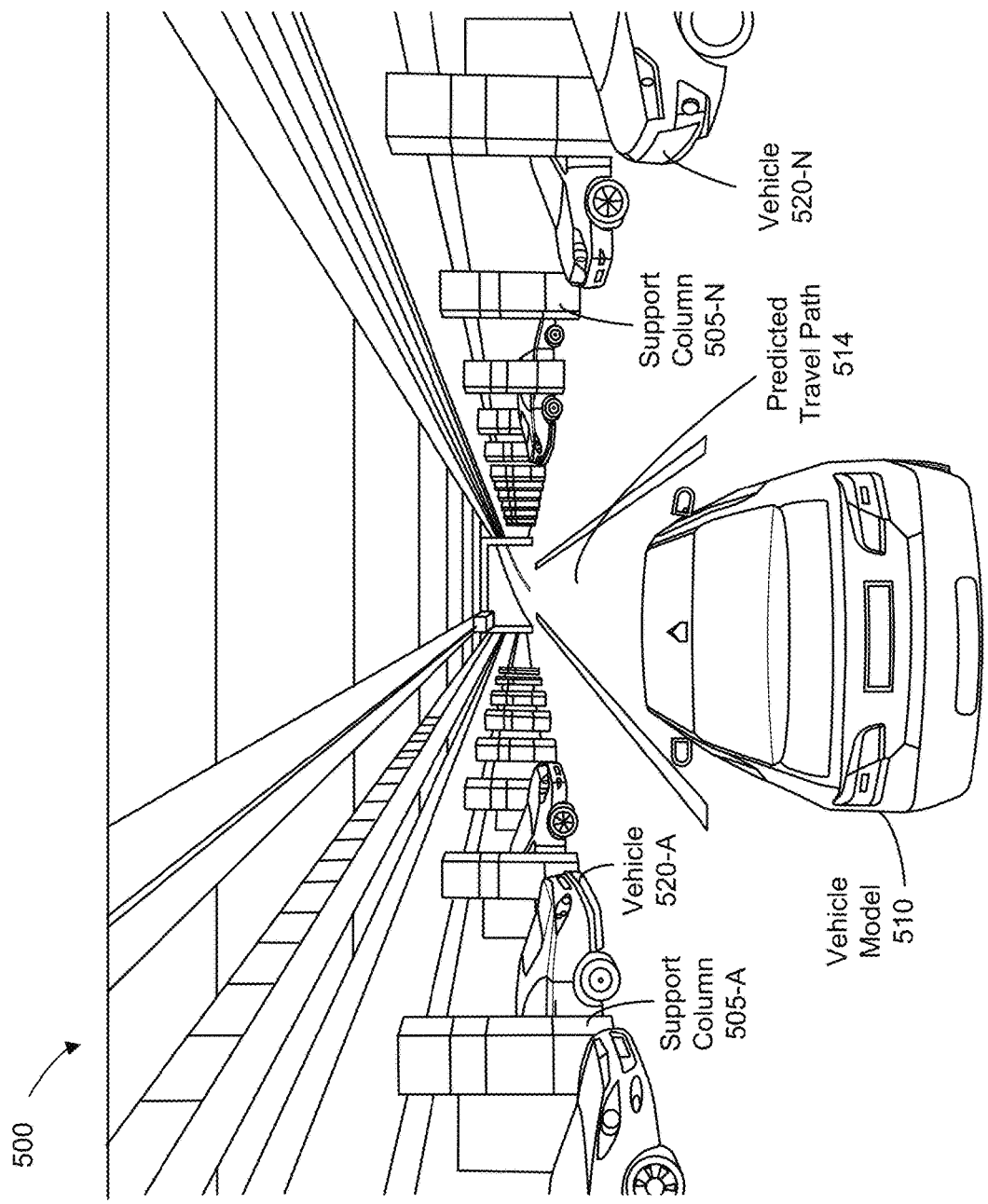

FIG. 5 illustrates an example of a visual representation 500 that, like the visual representation 400 in FIG. 4, includes a model 510 of a vehicle. The visual representation 500 represents a single image from a video generated using data captured by one or more cameras of the vehicle. Unlike the visual representation 400, the visual representation 500 does not correspond to a 360-degree video. Further, the perspective in visual representation 500 is from directly behind the vehicle. FIG. 5 depicts a close-quarter environment similar to that depicted in FIG. 3, where the vehicle is situated inside a parking garage. In the example of FIG. 5, there are no pedestrians, but instead there are a plurality of vehicles 520 parked in different parking spaces separated by support columns 505. Similar to FIG. 3, a predicted travel path 514 is included in the visual representation 500.

Artificial Reconstructions

Figure 6:
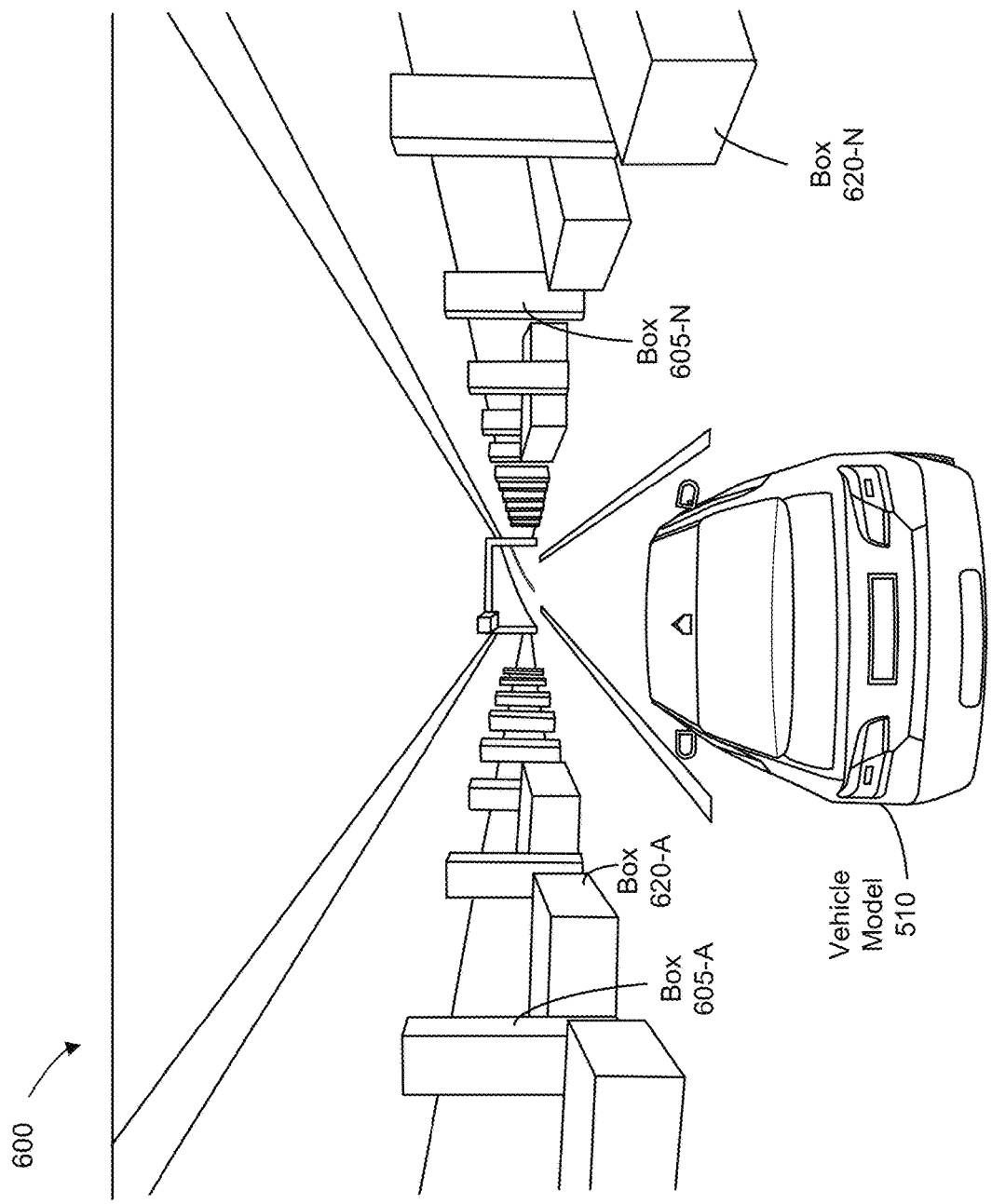

FIG. 6 illustrates an example of a visual representation 600 corresponding to a 3D reconstruction of a surrounding environment. In FIG. 6, the driving situation is the same as in FIG. 5. However, instead of showing camera images, the visual representation 600 is a simplified representation of the surrounding environment. In particular, the various structural elements of the garage (e.g., support columns 505) and the various objects within the garage (e.g., vehicles 520) are represented as graphical elements in the form of boxes 605 and 620, respectively. The size and location of the boxes can be determined based on sensor data. In this regard, although the visual representation 600 does not include camera images, it is understood that information about the vehicle and/or the surrounding environment can nevertheless be derived from camera data. For example, the sizes of the boxes 605 and 620 can be based on distance estimates derived from fusion of camera data with LIDAR, radar and/or ultrasonic sensor data. Alternatively, the 3D reconstruction could be generated using raw data from one or more sensors. For example, the visual representation can be generated based on the point cloud output of a LIDAR sensor. Point clouds are collections of points that represent a 3D shape or feature.

FIG. 6 is merely an example of an artificial reconstruction of a surrounding environment. It will be appreciated that the manner in which the vehicle and/or the features of a surrounding environment are represented in an artificial reconstruction can vary. For example, the level of detail in a reconstruction can be varied depending on the type of driving environment (e.g., indoor versus outdoor), the quality of the communication link(s) between vehicle system 102 and remote computer system 106, based on input from the remote operator, and/or other factors. To illustrate, if the data transmission speed between vehicle system 102 and remote computer system 106 is limited, a reconstruction using geometric approximations of objects (e.g., polygon meshes) may be appropriate as a substitute for camera images. If the data transmission speed is severely limited, then a reconstruction based on simpler approximations (e.g., boxes such as those depicted in FIG. 6) may be more appropriate. As another example, a reconstruction does not have to include a model of the vehicle, but can instead depict the vehicle as a 2D icon or omit a vehicle depiction altogether.

Remote Control System

Figure 7:
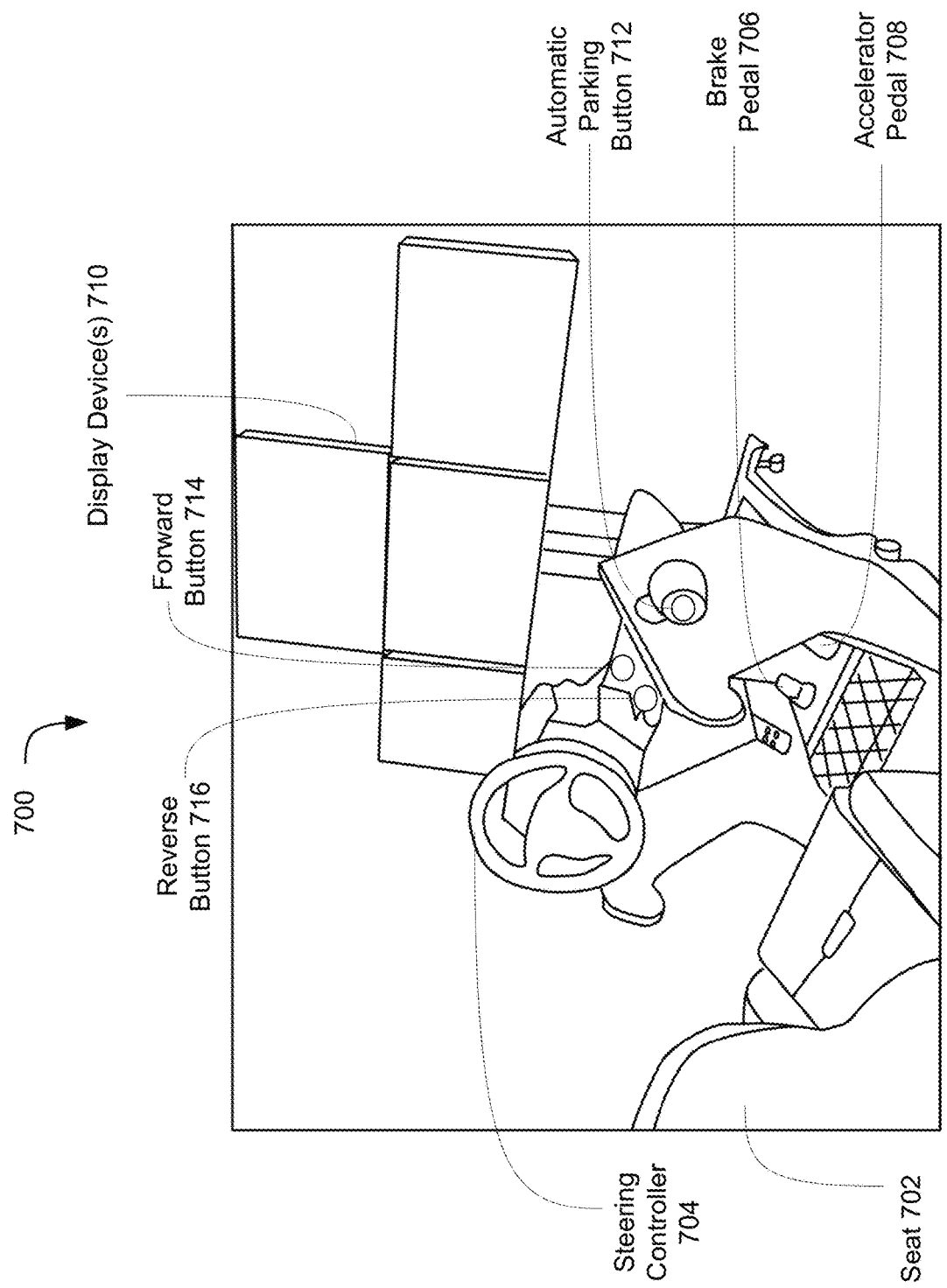
FIG. 7 illustrates an example teleoperation system that may be incorporated into a computing environment in accordance with one or more embodiments.

FIG. 7 illustrates an example remote control system 700 in accordance with certain embodiments. The remote control system 700 may correspond to remote control system 140 in FIG. 1. Remote control system 700 enables a user (i.e., the remote operator) to remotely operate a vehicle through communication between remote control system 700 and a vehicle system (e.g., vehicle system 102). In close-quarter environments, a human operator may be better at responding to a multitude of often unpredictable situations than a fully automated remote control system.

Remote control system 700 comprises a set of components that provide output to and receive input from the remote operator. These components may include, for example, one or more display devices 710, a seat 702, a steering controller 704, a brake pedal 706, an accelerator pedal 708, an automated parking button 712, a forward button 714, and a reverse button 716. FIG. 7 is merely provided as an example; other configurations (e.g., configurations comprising components not illustrated in FIG. 7) are also contemplated to be within the scope of the disclosure. For example, one or more components may be omitted from FIG. 7, placed at another location in FIG. 7, consolidated with another component illustrated in FIG. 7, and/or added to FIG. 7 without departing from the scope of the disclosure or the spirit of the appended claims.

Display device(s) 710 may be used to present a visual representation of a surrounding environment (e.g., composite mapping 300 and/or any of the other example visual representations discussed earlier) to the remote operator. For example, each display device 710 illustrated in FIG. 7 may be used to present a composite mapping incorporating the perspective of a different camera. Thus, each display device 710 may correspond to a different camera view. Although FIG. 7 illustrates display device(s) 710 as an upside-down "T" configuration of four flat screens, it should be appreciated that other configurations are also contemplated to be within the scope of the disclosure. For example, in some embodiments, display device(s) 710 may comprise a single curved screen that presents a composite mapping incorporating a 360-degree view stitched together from multiple cameras.

In certain embodiments, different types of visual representations may be presented on different display devices 710 simultaneously. For example, composite mapping 300 could be displayed on a first display device while a second display device displays a reconstruction in accordance with the visual representation 600 of FIG. 6. In this manner, the remote operator can be provided with different visualizations of the same scene.

Alternatively, as mentioned earlier, the vehicle system 102 may switch among data associated with different types of visual representations, for example, depending on data transmission speed. Accordingly, display device(s) 710 may switch from one type of visual representation to another based on the data that remote computer system 106 receives. In certain embodiments, the same perspective is maintained when switching from one visual representation to another. For example, if a switch to a reconstruction is performed in response to determining that the data transmission speed has dropped below a threshold, the reconstruction may be generated such that the view of the surrounding environment is from the same perspective as the visual representation that the reconstruction is replacing. In this manner, the remote operator can be provided with a seamless viewing experience that facilitates ongoing maneuvering of the vehicle.

The remote operator may view display device(s) 710 from a cockpit comprising seat 702 and a plurality of devices that enable remote operation of the vehicle responsive to output provided at the remote control system 700. Examples of such output include, but are not limited to, a visual representation presented via display device(s) 710, audio from a speaker (not shown), and/or haptic feedback from the steering controller 704. The remote control system 700 may generate, via signals communicated to remote actuation logic 128, driving and/or parking instructions in response to input provided by the remote operator using any of the input devices mentioned above. For example, steering controller 704 may generate a signal for causing the vehicle to make a turn; brake pedal 706 may generate a signal for causing the vehicle to slow or stop; accelerator pedal 708 may generate a signal for causing the vehicle to increase its speed; automated parking button 712 may generate a signal for initiating automated parking feature 116; and buttons 714 and 716 may generate signals for controlling a transmission system of vehicle system 102.

Process Overview

Example processes and methods for remotely operating a vehicle in accordance with embodiments of the present disclosure will now be described with reference to FIGS. 8-10. Although FIGS. 8-10 illustrate steps performed in a particular order, it should be appreciated that different orders are also contemplated to be within the scope of the disclosure. For example, one or more elements may be omitted, performed in parallel, and/or added without departing from the scope of the disclosure or the spirit of the appended claims.

FIGS. 8-10 illustrate interactions involving various systems, including vehicle system 102, teleoperation system 104, remote computer system 106, and remote control system 140. However, it should be appreciated that a different combination of systems is also contemplated to be within the scope of the disclosure. For example, one or more systems may be omitted, consolidated with another system, and/or added without departing from the scope of the disclosure or the spirit of the appended claims.

Figure 8A:
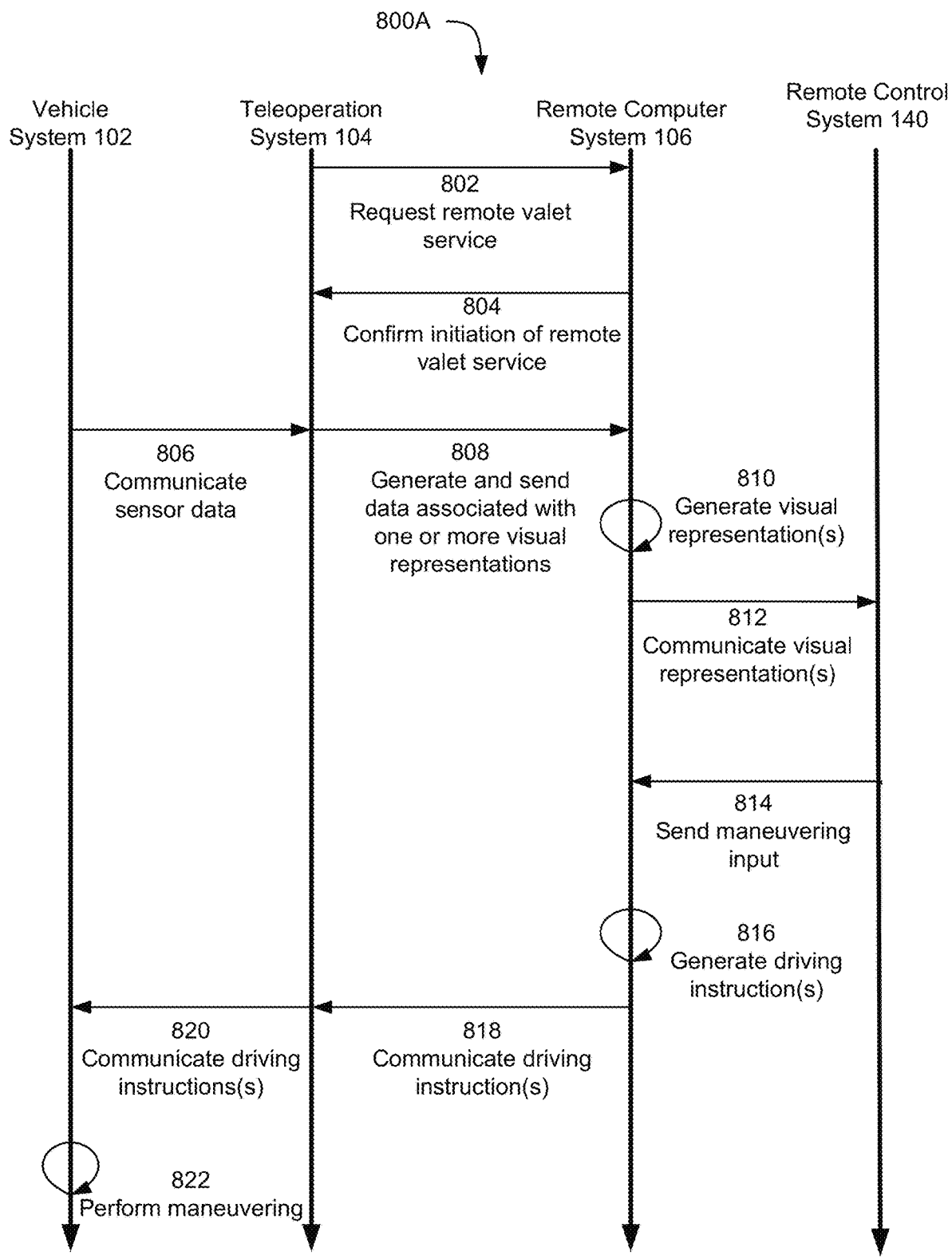
FIGS. 8A-C illustrate an example process for remotely maneuvering and parking a vehicle in accordance with certain embodiments.
Figure 8B:
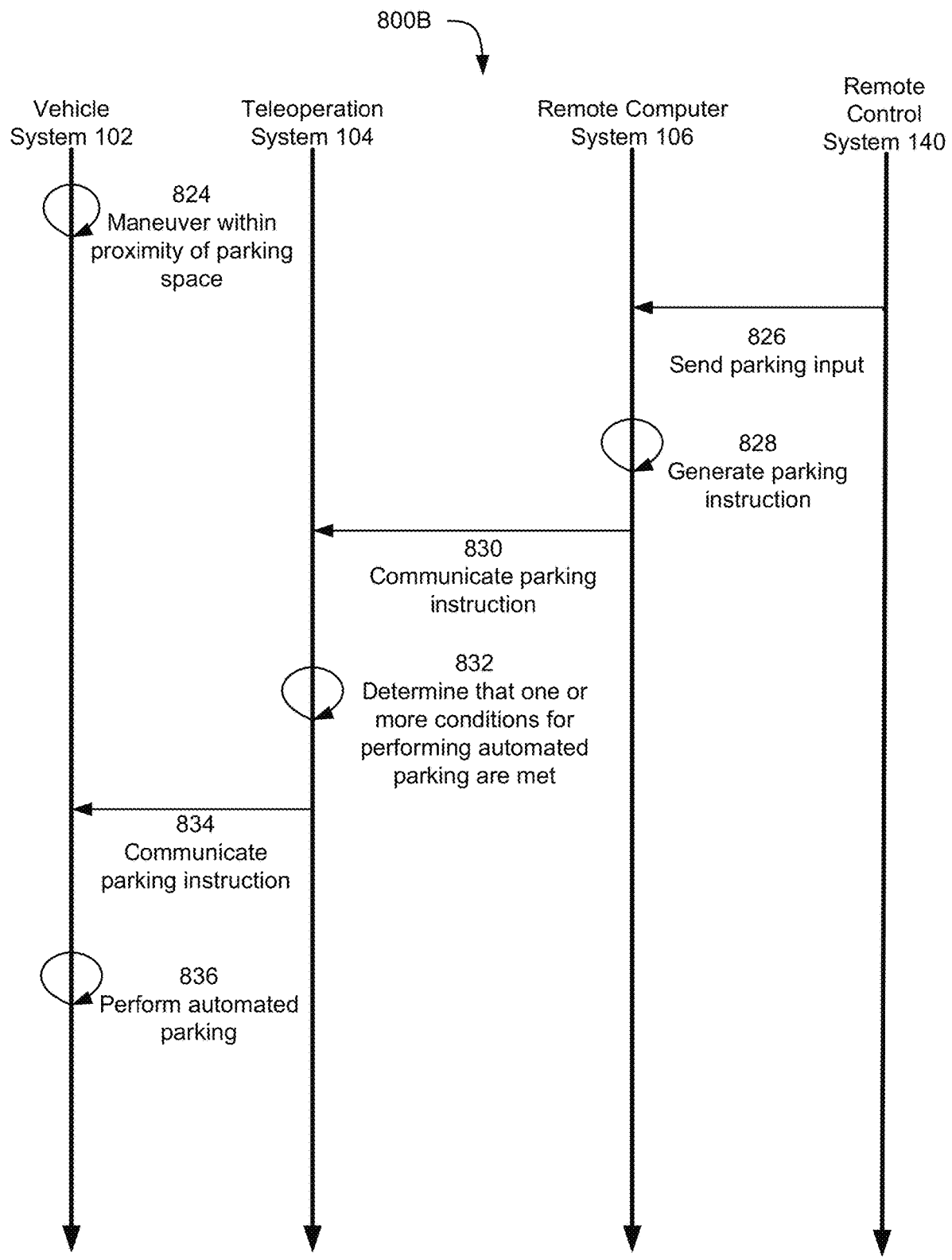
Figure 8C:
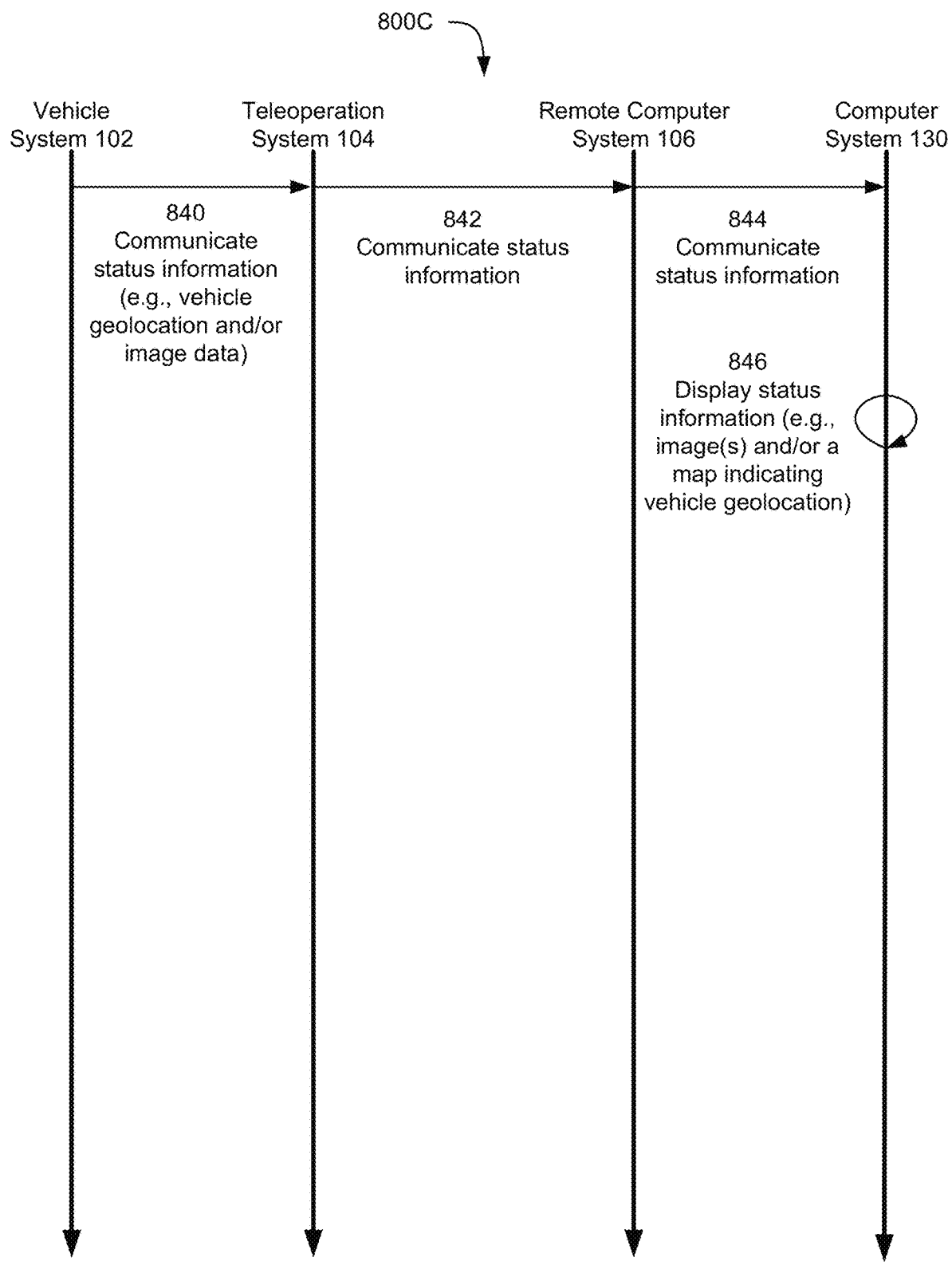

FIGS. 8A-C illustrate an example process 800, comprising processes 800A-C, for remotely maneuvering and parking a vehicle within a parking environment. FIG. 8A illustrates process 800A for remotely maneuvering a vehicle within a parking environment.

At step 802, teleoperation system 104 communicates a request for remote valet service to remote computer system 106. For example, when the vehicle arrives at a parking garage entrance, the driver of the vehicle may push a call button located on the rear-view mirror or on the dashboard to request remote valet service. As used herein, "remote valet service" comprises maneuvering, parking, and unparking of a vehicle via a remote computer system.

At step 804, remote computer system 106 communicates a confirmation that the remote valet service has been initiated. For example, the confirmation may include an audio-visual message that is presented to the driver through teleoperation system 104.

At step 806, the vehicle system 102 communicates sensor data to teleoperation system 104. The sensor data communicated in step 806 may include raw and/or processed data captured by the sensors 114.

At step 808, the teleoperation system 104 generates data associated with one or more visual representations and sends this data to remote computer system 106. The communication of the data in step 808 can be performed automatically by teleoperation system 104 (e.g., continuously or at specific time intervals after receiving the confirmation in step 804) or in response to a specific request from remote computer system 106.

In the example of FIG. 8A, the data sent in step 808 is used to generate the visual representation(s) at the remote computer system 106. However, as discussed earlier, visual representations may be generated at the vehicle system 102 (e.g., by teleoperation system 104) and sent to the remote computer system 106 (e.g., as images). The data sent to remote computer system 106 in step 808 may include raw sensor data, processed sensor data, and/or data derived from sensor data. For example, teleoperation system 104 may send distance values, object coordinates, and/or other attributes of features identified based on the sensor data communicated in step 806. The attributes may be determined by teleoperation system 104 based on the sensor data. Alternatively or additionally, attributes may be determined by another component of vehicle system 102 (e.g., one or more ECUs 112) and sent to teleoperation system 104 along with the sensor data in step 806.

At step 810, the remote computer system 106 generates the one or more visual representations using the data sent by the teleoperation system 104 in step 808. For example, remote computer system 106 may generate a composite mapping responsive to receiving the data in step 808.

At step 812, the visual representation(s) are communicated to remote control system 140. The visual representation(s) may be displayed to the remote operator via one or more display devices of the remote control system 140.

At step 814, the remote control system 140 sends a maneuvering input for remotely maneuvering the vehicle to remote computer system 106. The maneuvering input may comprise one more signals generated in response to input from the remote operator using remote control system 140.

At step 816, the remote computer system 106 generates one or more driving instructions based on the maneuvering input received in step 814. Alternatively, the remote computer system 106 may comprise an automated control feature (e.g., an artificial intelligence system) that automatically generates the driving instructions, e.g., based on the data received in step 808. Generating the driving instructions may comprise converting the signals generated by remote control system 140 into a format that is compatible with software executing at teleoperation system 104 and/or a format that is in compliance with a communication protocol used by teleoperation system 104.

At step 818, the remote computer system 106 communicates the driving instruction(s) to teleoperation system 104.

At step 820, the teleoperation system 104 communicates the driving instruction(s) received in step 818 to the vehicle system 102 (e.g., to one or more ECUs 112). In certain embodiments, the teleoperation system 104 may convert the driving instructions into corresponding control signals.

At step 822, the vehicle system 102 performs maneuvering based on the driving instruction(s) received from teleoperation system 104. Some or all of elements 806-822 may be repeated until the vehicle is maneuvered within proximity of an available parking space. As used herein, a location that is "within proximity" of a parking space is a location at which an automated parking feature may be initiated such that vehicle system 102 can successfully park the vehicle into the parking space. In one embodiment, a remote operator may continue providing instructions to the vehicle system to park the vehicle, in case the automated parking feature is not available.

FIG. 8B illustrates process 800B for remotely parking the vehicle within the parking environment. Process 800B may follow process 800A. Thus, at step 824, vehicle system 102 maneuvers the vehicle within proximity of an available parking space, e.g., based on the steps illustrated in FIG. 8A.

At step 826, the remote control system 140 sends to the remote computer system 106 a parking input for remotely initiating the automated parking feature 116 of vehicle system 102. The parking input may comprise one more signals generated in response to input from the remote operator using remote control system 140.

Although not depicted in FIG. 8B, the communication of data and the generation of visual representations in steps 806 to 812 of FIG. 8A may be performed repeatedly before and/or after receiving the parking input in step 826. For example, visual representations may continue to be output on a display device of the remote control system 140 during execution of automated parking (step 836 below) in order to provide the remote operator with updates on the status of the vehicle.

In certain embodiments, the parking input may indicate a location of, or other information about, the parking space. For example, the remote operator may select the parking space from among a set of parking spaces depicted in a visual representation displayed on the one or more display devices of remote control system 140. As another example, the remote operator may identify the boundaries of the parking space in order to assist the vehicle system 102 in determining an optimal path to the parking space.

At step 828, the remote computer system 106 generates a parking instruction in response to receiving the parking input. Generating the parking instruction may comprise converting the parking input generated by remote control system 140 into a format that is compatible with software executing at teleoperation system 104 and/or a format that is in compliance with a communication protocol used by teleoperation system 104.

As an alternative to generating the parking instruction based on the parking input from remote control system 140, the remote computer system 106 may comprise an automated control feature (e.g., an artificial intelligence system) that automatically generates the parking instruction based on data received from teleoperation system 104. Accordingly, in embodiments where remote computer system 106 includes an automated control feature, sensor data or data derived therefrom can be processed by the remote computer system 106 to determine when to initiate automated parking. In another embodiment, the determination of when to initiate automated parking can be performed at vehicle system 102 (e.g., by teleoperation system 104).

At step 830, the remote computer system 106 communicates the parking instruction to teleoperation system 104.

At step 832, the teleoperation system 104 determines that one or more conditions for performing automated parking are met. The conditions may be based on sensor data captured by the sensors 114 of vehicle system 102. For example, the teleoperation system 104 may determine that the vehicle is within a certain distance of the parking space, that there are no obstacles (e.g., pedestrians) between the parking space and the vehicle, and/or that the boundaries of the parking space are detectable based on data captured by the sensors 114.

At step 834, the teleoperation system 104 communicates the parking instruction to vehicle system 102 (e.g., to one or more ECUs 112) in response to the determination in step 832 that one or more conditions for performing automated parking are met. In certain embodiments, the teleoperation system 104 may convert the parking instruction into corresponding control signals.

At step 836, the vehicle system 102 performs automated parking using the automated parking feature 116 in response to receiving the parking instruction from teleoperation system 104. The automated parking may involve various computations performed by vehicle system 102, such as calculating an optimal path to the parking space, determining what type of parking maneuver is needed (e.g., parallel, angle, or reverse parking), and/or determining an optimal position for the vehicle within the parking space (e.g., taking into consideration the presence of other vehicles parked adjacent to the parking space).

FIG. 8C illustrates process 800C for communicating status information relating to the vehicle. Process 800C may follow process 800B and can be used to communicate information about the vehicle in relation to the space in which the vehicle is parked. At step 840, the vehicle system 102 communicates vehicle status information (e.g., vehicle geolocation and/or image data) to teleoperation system 104.

At step 842, the teleoperation system 104 forwards the status information to the remote computer system 106. In turn, the remote computer system 106 forwards this information to the computer system 130 in step 844. Alternatively, since computer system 130 is communicatively coupled to vehicle system 102 via the network 108, the teleoperation system 104 can send the status information to computer system 130 without going through the remote computer system 106.

At step 846, the computer system 130 displays the status information to the user of computing system 130 (e.g., the driver of the vehicle). The displaying of the status information can be performed using one or more display devices of computer system 130 and may include displaying one or more images captured by a camera of the vehicle, where the images depict the parking space and/or an area around the parking space. The displaying can also include displaying a map indicating the geolocation of the vehicle. The displayed status information may notify the user that the vehicle has been parked, provide evidence that the vehicle was not damaged while being parked, and/or indicate where vehicle is parked.

Figure 9A:
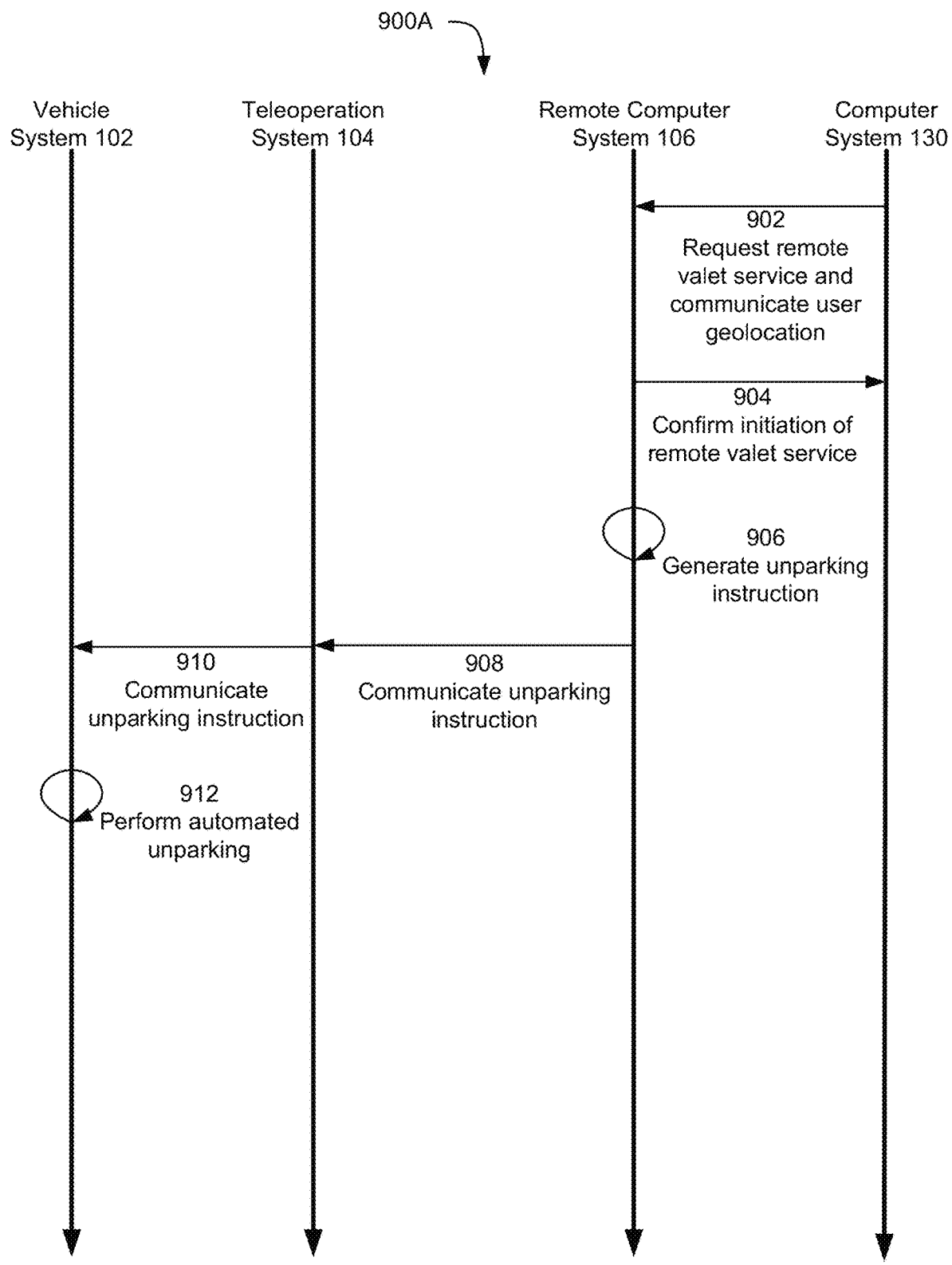
FIGS. 9A-B illustrate an example process for remotely unparking and maneuvering a vehicle in accordance with certain embodiments.
Figure 9B:
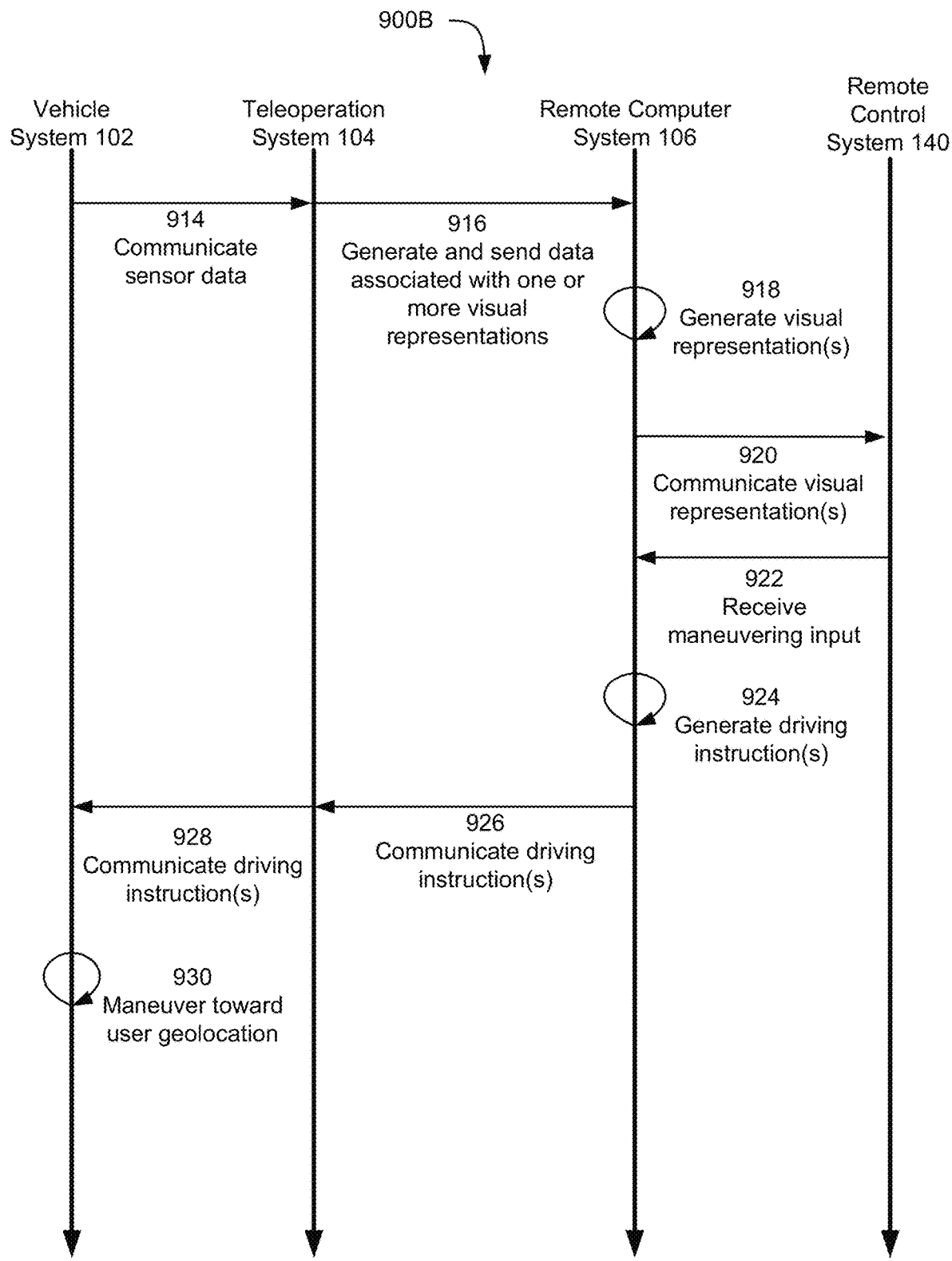
Figure 10:
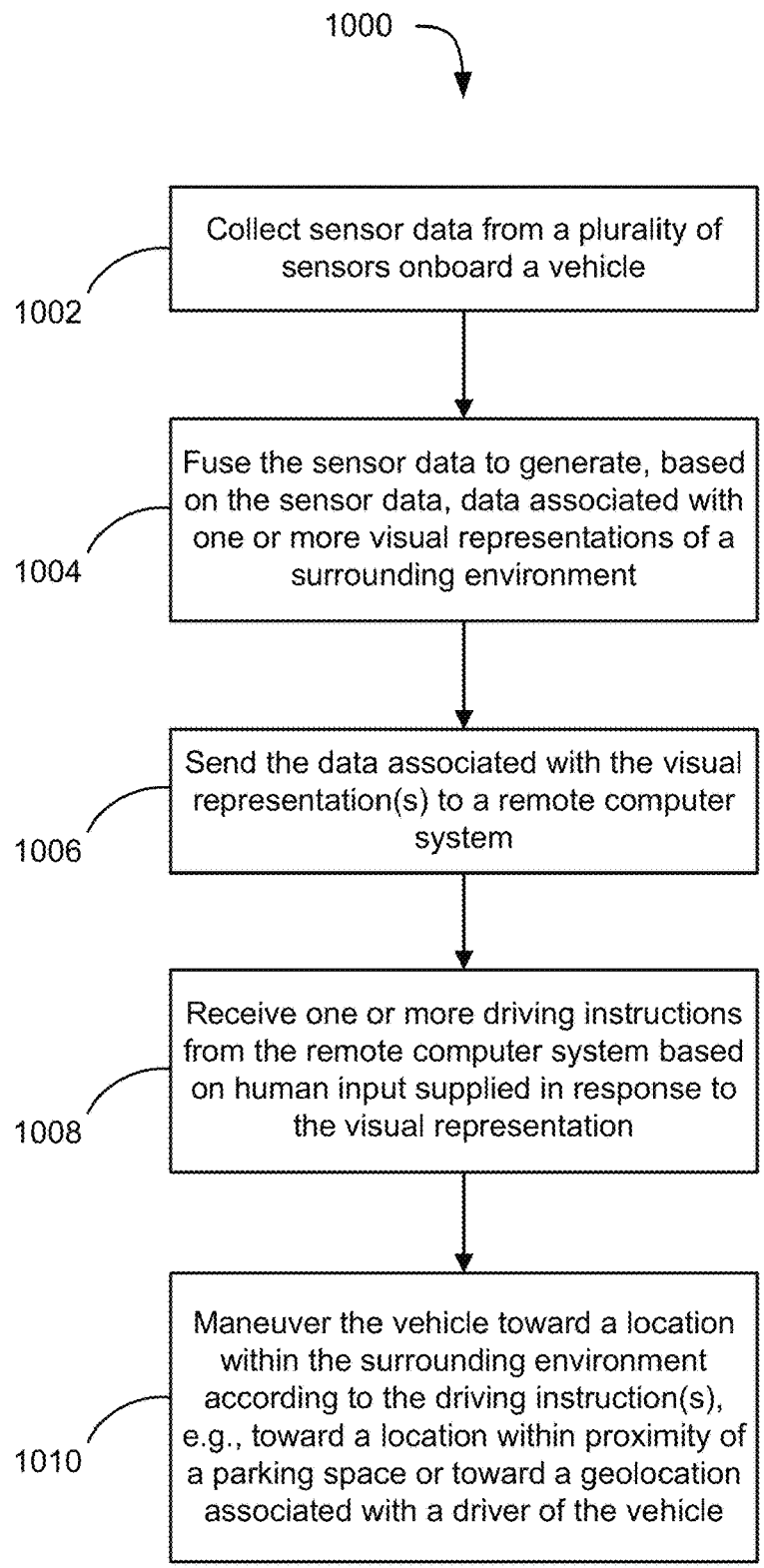
FIG. 10 is a simplified flowchart of a method for maneuvering a vehicle in accordance with certain embodiments.

FIGS. 9A-B illustrate an example process 900, comprising processes 900A-B, for remotely unparking and maneuvering a vehicle within a parking environment. FIG. 9A illustrates process 900A for remotely unparking a vehicle from a parking space.

At step 902, a user of computer system 130 (e.g., the driver of the vehicle) uses the computer system 130 to communicate a request to remote computer system 106 for remote valet service. The request may include a geolocation associated with the user. The geolocation may be the current geolocation of computer system 130 or some other geolocation specified by the user. For example, as a user is leaving a restaurant, the user may use a smartphone app to communicate a request that the remote valet service deliver the vehicle from its parked location to a geolocation outside the restaurant.

At step 904, the remote computer system 106 sends a confirmation to computer system 130 that the remote valet service has been initiated. For example, the confirmation may include an audiovisual message that is presented to the user at computer system 130.

At step 906, the remote computer system 106 generates an unparking instruction. The unparking instruction may comprise a command to perform automated unparking of the vehicle from its parking space.

At step 908, the remote computer system 106 communicates the unparking instruction to the teleoperation system 104.

At step 910, the teleoperation system 104 communicates the unparking instruction to the vehicle system 102 (e.g., to one or more ECUs 112). In certain embodiments, the teleoperation system 104 may convert the unparking instruction into one or more corresponding control signals.

At step 912, the vehicle system 102 performs automated unparking in response to the unparking instruction. In particular, the vehicle system 102 may use the automated parking feature 116 to maneuver the vehicle out of its parking space without human intervention (e.g., from the driver or the remote operator). After the vehicle has been maneuvered out of the parking space, control of the vehicle may be turned over to the remote operator, as illustrated in FIG. 9B.

FIG. 9B illustrates process 900B for remotely maneuvering the vehicle within the parking environment. Process 900B may be performed after process 900A. Furthermore, some or all of the steps in process 900B may be repeated until the vehicle arrives at a geolocation associated with the user.

Process 900B involves steps analogous to those described in reference to process 800A in FIG. 8A. For example, process 900B begins at step 914 with the vehicle system 102 communicating sensor data captured by the sensors 114 to the teleoperation system 104. For simplicity, certain details discussed in connection with process 800A are omitted from the discussion of process 900B.

At step 916, the teleoperation system 104 generates and sends data associated with one or more visual representations to the remote computer system 106. As described earlier in connection with step 808, this data may include raw sensor data, processed sensor data, and/or data derived from sensor data.

At step 918, the remote computer system 106 generates one or more visual representations based on the data sent in step 916. However, as described earlier in in reference to process 800A, visual representations can also be generated by the vehicle system (e.g., by teleoperation system 104).

At step 920, the remote computer system 106 communicates the visual representation(s) to the remote control system 140.

At step 922, the remote computer system 106 receives a maneuvering input from the remote control system 140 based on input from the remote operator.

At step 924, the remote computer system generates one or more driving instructions based on the maneuvering input. Alternatively, as mentioned earlier in connection with step 816, the maneuvering input can be automatically generated by remote computer system 106.

At step 926, the remote computer system 106 communicates the driving instruction(s) to the teleoperation system 104.

At step 928, the teleoperation system 104 communicates the driving instruction(s) to the vehicle system 102 (e.g., to one or more ECUs 112).

At step 930, the vehicle system 102 maneuvers the vehicle toward the geolocation associated with the user based on the driving instruction(s) received from teleoperation system 104. Some or all of steps 914-930 may be repeated until the vehicle arrives at the geolocation associated with the user.

FIG. 10 is a flowchart of a method 1000 for maneuvering a vehicle in accordance with certain embodiments of the present disclosure. The method 1000 involves steps similar to those discussed earlier in reference to the processes 800 and 900. The method 1000 can be used to maneuver the vehicle in connection with parking, unparking, or general driving within any physical environment including, but not limited to, close-quarter environments. The method 1000 can be performed by a vehicle computer system, e.g., the vehicle system 102.

At step 1002, the vehicle computer system collects sensor data from a plurality of sensors (e.g., the sensors 114) onboard the vehicle. As discussed earlier in reference to FIG. 2, various configurations of sensors are possible, and the vehicle can be equipped with one or more cameras, ultrasonic sensors, radar sensors, LIDAR sensors, motion sensors, etc. The sensor data may be collected into a single location (e.g., a memory accessed by teleoperation system 104). In some embodiments, sensor data may be sent from individual sensors to ECUs 112 for processing before being collected. Sensor data can be collected in raw form. Sensor data can also be processed, e.g., internally within the one or more sensors, by the ECUs 112, and/or the teleoperation system 104.

At step 1004, the collected sensor data is processed through fusion of the sensor data to generate data associated with one or more visual representations of the surrounding environment. Step 1004 can be performed by teleoperation system 104 (e.g., using mapping logic 122) and/or elsewhere in the vehicle system 102 (e.g., by one or more ECUs 112).

The fusion does not have to be performed using all of the collected sensor data. Instead, fusion can be performed using as little as sensor data from a first sensor (e.g., a camera) and sensor data from a second sensor (e.g., a second camera or a non-camera sensor). Thus, the data associated with a visual representation can be generated by fusing sensor data from a first sensor of the plurality of sensors with sensor data from at least a second sensor of the plurality of sensors. However, fusing data from additional sensors may provide a greater amount of information about the status of the vehicle and/or attributes of features in the surrounding environment.

The fusing of the sensor data may involve identifying one or more features of the surrounding environment. As discussed earlier in reference to mapping logic 122 in FIG. 1, identifying a feature may comprise detecting the presence of the feature in the surrounding environment and/or determining, based on the sensor data, one or more attributes of the detected feature. Detectable features include, but are not limited to, pedestrians, other vehicles, structural elements of a driving environment (e.g., walls, pylons, or support columns), parking space boundary markers, or direction arrows painted on the ground. The data associated with the visual representation may be indicative of detected features. For example, with regard to objects in the surrounding environment, the data associated with the visual representation can indicate attributes such as: a distance of the object from the vehicle, a location of the object, a trajectory of the object, a speed of the object, a shape of the object, or a size of the object.

At step 1006, the vehicle computer system sends the data associated with the visual representation(s) to a remote computer system (e.g., remote computer system 106). The remote computer system may process the data to output the visual representation(s) on one or more display devices viewed by a remote operator (e.g., using the display devices 710 depicted in FIG. 7). As discussed earlier, various types of visual representations are possible. For example, the visual representations may comprise a video or a reconstruction (e.g., a 3D reconstruction including a model representing the vehicle in spatial relation to objects in the surrounding environment). The video or reconstruction may include one or more graphical elements corresponding to objects and/or attributes determined in step 1004. Examples of graphical elements include, but are not limited to, those depicted in FIG. 3 (e.g., an outline around an object, a silhouette of the object, or a graphical indication of the distance of the object from the vehicle).

At step 1008, the vehicle computer system receives one or more driving instructions from the remote computer system based on human input (i.e., input from the remote operator) supplied in response to the visual representation(s). As explained earlier, the driving instructions may be instructions for longitudinal and/or lateral control of the vehicle. The visual representation(s) may be updated by repeating steps 1002-1006 after receiving a driving instruction.

In certain embodiments, the method 1000 may include a step of monitoring a transmission speed of a wireless communication link between the vehicle computer system and the remote computer system. The vehicle computer system may switch from sending video data to sending data associated with a reconstruction (e.g., a 3D reconstruction) of the surrounding environment in response to determining that the transmission speed has dropped below a threshold.

In certain embodiments, the vehicle system may also be configured to perform automated emergency braking (e.g., using the automated braking feature 118) and/or configured to perform automatic speed reduction (e.g., through reducing acceleration, applying brakes, or a combination of both). Automated emergency braking could be performed in response to determining, by the vehicle system, that a driving instruction received from the remote computer system would cause the vehicle to collide with an object.

Automatic speed reduction could be performed in response to detecting, by the vehicle system, an interruption in the wireless communication link, which is used to send data associated with a visual representation to the remote computer system. The automatic speed reduction may reduce the speed at a certain rate (e.g., a rate set by an ECU 112) until the vehicle comes to a stop or until the wireless communication link becomes available again. The rate of speed reduction could be based on various factors such as the length of the interruption (e.g., gradually increasing the rate as the interruption continues over time, in order to safely reduce the speed and avoid a sudden stop), the current speed of the vehicle, and/or the distances to any nearby objects.

Automated emergency braking can be performed to prevent imminent collisions even when the vehicle isn't being remotely operated. Therefore, automated emergency braking can be enabled whenever the vehicle is running or upon beginning remote operation of the vehicle. Automatic speed reduction can also be enabled so as to be available during remote operation (e.g., based on detecting that the wireless communication link has been established).

In step 1010, the vehicle computer system maneuvers the vehicle toward a location within the surrounding environment according to the driving instruction(s). The location to which the vehicle is ultimately maneuvered may, for example, be a location within proximity to a parking space or a geolocation associated with the driver of the vehicle. From the examples discussed earlier, it will be understood that multiple maneuvers may be used to bring the vehicle to the location. Further, the visual representation(s) may be continually updated for display on the display device(s) of the remote computer system in order to assist the remote operator in determining how to maneuver the vehicle. Accordingly, steps 1002-1010 may be repeated until the vehicle computer system and/or the remote operator decides to terminate remote operation of the vehicle.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
   collecting, by a computer system of a vehicle equipped with a plurality of sensors, sensor data from the plurality of sensors;

generating, by the computer system based on the sensor data, data associated with a visual video representation of a surrounding environment, wherein the generating of the data associated with the video representation comprises fusing sensor data from a first sensor of the plurality of sensors with sensor data from at least a second sensor of the plurality of sensors to identify one or more features of the surrounding environment, and wherein the data associated with the video representation is indicative of the one or more features;

sending, by the computer system, the data associated with the video representation to a remote computer system through a wireless communication link;

monitoring a transmission speed of the wireless communication link;

switching from sending the data associated with the video representation to sending data associated with a three-dimensional reconstruction of the surrounding environment in response to determining that the transmission speed has dropped below a threshold, wherein the three-dimensional reconstruction is generated based on fused sensor data;

receiving, by the computer system, driving instructions from the remote computer system, the driving instructions based on human input supplied in response to the video representation or the three-dimensional reconstruction after the video representation or the three-dimensional reconstruction has been displayed at the remote computer system based on data sent through the wireless communication link; and maneuvering, by the computer system, the vehicle toward a location within the surrounding environment according to the driving instructions.

2. The method of claim 1, further comprising:
receiving, by the computer system, a parking instruction from the remote computer system after reaching the location, wherein the location is within proximity of a parking space; and
performing, by the computer system, automated parking in response to the parking instruction, the automated parking causing the vehicle to park into the parking space.

3. The method of claim 1, wherein the one or more features include an object in the surrounding environment, and wherein the data associated with the video representation or the data associated with the three-dimensional reconstruction is indicative of at least one of the following attributes of the object:
a distance of the object from the vehicle;
a location of the object;
a trajectory of the object;
a speed of the object;
a shape of the object; or
a size of the object.

4. The method of claim 3, wherein the video representation or the three-dimensional reconstruction includes one or more graphical elements corresponding to the at least one of the attributes of the object.

5. The method of claim 4, wherein the one or more graphical elements include at least one of an outline around the object, a silhouette of the object, or a graphical indication of the distance of the object from the vehicle.

6. The method of claim 1, wherein the video representation or the three-dimensional reconstruction includes a three-dimensional model of the vehicle such that a boundary of the vehicle in spatial relation to an object in the surrounding environment is visible when the video representation or the three-dimensional reconstruction is displayed.

7. The method of claim 1, further comprising:
in response to detecting an interruption in the wireless communication link, performing, by the computer system, automatic speed reduction until the vehicle comes to a stop or until the wireless communication link becomes available again.

8. The method of claim 1, wherein the one or more features include an object in the surrounding environment, the method further comprising:
performing, by the computer system, automated emergency braking in response to determining that a driving instruction received from the remote computer system would cause the vehicle to collide with the object.

9. The method of claim 1, wherein the first sensor is a camera, and wherein each sensor of the at least a second sensor is one of the following:
an additional camera;
a LIDAR sensor;
a radar sensor; or
an ultrasonic sensor.

10. A computer system comprising:
one or more processors; and
one or more computer-readable storage media storing instructions that, when executed by the one or more processors, cause the one or more processors to:
collect sensor data from a plurality of sensors located in a vehicle;
generate data associated with a video representation of a surrounding environment, wherein the generating of the data associated with the video representation comprises fusing sensor data from a first sensor of the plurality of sensors with sensor data from at least a second sensor of the plurality of sensors to identify one or more features of the surrounding environment, and wherein the data associated with the video representation is indicative of the one or more features;
send the data associated with the video representation to a remote computer system through a wireless communication link;
monitor a transmission speed of the wireless communication link;
switch from sending the data associated with the video representation to sending data associated with a three-dimensional reconstruction of the surrounding environment in response to determining that the transmission speed has dropped below a threshold, wherein the three-dimensional reconstruction is generated based on fused sensor data;
receive driving instructions from the remote computer system, the driving instructions based on human input supplied in response to the video representation or the three-dimensional reconstruction after the video representation or the three-dimensional reconstruction has been displayed at the remote computer system based on data sent through the wireless communication link; and
maneuver the vehicle toward a location within the surrounding environment according to the driving instructions.

11. The computer system of claim 10, wherein the instructions further cause the one or more processors to:
receive a parking instruction from the remote computer system after reaching the location, wherein the location is within proximity of a parking space; and perform automated parking in response to the parking instruction, the automated parking causing the vehicle to park into the parking space.

12. The computer system of claim 10, wherein the one or more features include an object in the surrounding environment, and wherein the data associated with the video representation or the data associated with the three-dimensional reconstruction is indicative of at least one of the following attributes of the object:
   a distance of the object from the vehicle;
   a location of the object;
   a trajectory of the object;
   a speed of the object;
   a shape of the object; or
   a size of the object.

13. The computer system of claim 12, wherein the video representation or the three-dimensional reconstruction includes one or more graphical elements corresponding to the at least one of the attributes of the object.

14. The computer system of claim 13, wherein the one or more graphical elements include at least one of an outline around the object, a silhouette of the object, or a graphical indication of the distance from the object to the vehicle.

15. The computer system of claim 10, wherein the video representation or the three-dimensional reconstruction includes a three-dimensional model of the vehicle such that a boundary of the vehicle in spatial relation to an object in the surrounding environment is visible when the video representation or the three-dimensional reconstruction is displayed.

16. The computer system of claim 15, wherein the video representation or the three-dimensional reconstruction depicts the three-dimensional model from an overhead perspective.

17. The computer system of claim 10, wherein the instructions further cause the one or more processors to:
   perform automatic speed reduction in response to detecting an interruption in the wireless communication link, wherein the automatic speed reduction is performed until the vehicle comes to a stop or until the wireless communication link becomes available again.

18. A computer-readable storage medium storing instructions that, when executed by one or more processors of a vehicle computer system, cause the one or more processors to perform the following:
   collecting sensor data from a plurality of sensors onboard a vehicle in which the vehicle computer system is deployed;
   generating, based on the sensor data, data associated with a video representation of a surrounding environment, wherein the generating of the data associated with the video representation comprises fusing sensor data from a first sensor of the plurality of sensors with sensor data from at least a second sensor of the plurality of sensors to identify one or more features of the surrounding environment, and wherein the data associated with the video representation is indicative of the one or more features;
   sending the data associated with the video representation to a remote computer system through a wireless communication link;
   monitoring a transmission speed of the wireless communication link;
   switching from sending the data associated with the video representation to sending data associated with a three-dimensional reconstruction of the surrounding environment in response to determining that the transmission speed has dropped below a threshold, wherein the three-dimensional reconstruction is generated based on fused sensor data;
   receiving driving instructions from the remote computer system, the driving instructions based on human input supplied in response to the video representation or the three-dimensional reconstruction after the video representation or the three-dimensional reconstruction has been displayed at the remote computer system based on data sent through the wireless communication link; and
   maneuvering the vehicle toward a location within the surrounding environment according to the driving instructions.

* * * * *